US010331681B1

(12) United States Patent
Chen et al.

(10) Patent No.: US 10,331,681 B1
(45) Date of Patent: Jun. 25, 2019

(54) CROWDSOURCED EVALUATION AND REFINEMENT OF SEARCH CLUSTERS

(71) Applicant: Google Inc., Mountain View, CA (US)

(72) Inventors: Jilin Chen, Sunnyvale, CA (US); Amy Xian Zhang, Cambridge, MA (US); Sagar Jain, Mountain View, CA (US); Lichan Hong, Mountain View, CA (US); Ed Huai-Hsin Chi, Palo Alto, CA (US)

(73) Assignee: GOOGLE LLC, Mountain View, CA (US)

( * ) Notice: Subject to any disclaimer, the term of this patent is extended or adjusted under 35 U.S.C. 154(b) by 460 days.

(21) Appl. No.: 15/095,626

(22) Filed: Apr. 11, 2016

Related U.S. Application Data

(60) Provisional application No. 62/267,724, filed on Dec. 15, 2015.

(51) Int. Cl.
 *G06F 16/24* (2019.01)
 *G06F 16/2457* (2019.01)
 *G06F 16/248* (2019.01)
 *G06F 16/28* (2019.01)

(52) U.S. Cl.
 CPC ...... *G06F 16/24578* (2019.01); *G06F 16/248* (2019.01); *G06F 16/285* (2019.01)

(58) Field of Classification Search
 CPC .................................. G06F 16/24; G06F 16/28
 USPC ......................................................... 707/723
 See application file for complete search history.

(56) References Cited

U.S. PATENT DOCUMENTS

| 7,139,695 | B2* | 11/2006 | Castellanos | G06F 17/271 |
| | | | | 704/4 |
| 9,396,255 | B2* | 7/2016 | Manohar | G06Q 50/01 |
| 2011/0055373 | A1* | 3/2011 | Bnayahu | G06F 17/30979 |
| | | | | 709/224 |
| 2013/0018960 | A1* | 1/2013 | Knysz | G06Q 50/01 |
| | | | | 709/204 |
| 2013/0231969 | A1* | 9/2013 | Van Pelt | G06Q 10/06311 |
| | | | | 705/7.13 |

(Continued)

OTHER PUBLICATIONS

Donna Vakharia et al, "Beyond Mechanical Turk: An Analysis of Paid Crowd Work Platforms", iConference 2015, 17 pages.*

(Continued)

*Primary Examiner* — Uyen T Le
(74) *Attorney, Agent, or Firm* — Brake Hughes Bellermann LLP

(57) ABSTRACT

Implementations provide an improved system for presenting search results based on entity associations of the search items. An example method includes, for each of a plurality of crowdsource workers, initiating display of a first randomly selected cluster set from a plurality of cluster sets to the crowdsource worker. Each cluster set represents a different clustering algorithm applied to a set of search items responsive to a query. The method also includes receiving cluster ratings for the first cluster set from the crowdsource worker and calculating a cluster set score for the first cluster set based on the cluster ratings. This is repeated for remaining cluster sets in the plurality of cluster sets. The method also includes storing a cluster set definition for a highest scoring cluster set, associating the cluster set definition with the query, and using the definition to display search items responsive to the query.

20 Claims, 14 Drawing Sheets

(56) References Cited

U.S. PATENT DOCUMENTS

| | | | |
|---|---|---|---|
| 2015/0044654 A1 | 2/2015 | Lendvay et al. | |
| 2015/0161230 A1* | 6/2015 | Alkov | G06F 17/30705 707/737 |
| 2015/0242447 A1 | 8/2015 | Grigorios et al. | |
| 2015/0254785 A1* | 9/2015 | Yang | G06N 7/005 705/26.41 |
| 2015/0262111 A1* | 9/2015 | Yu | G06Q 10/063112 705/7.14 |
| 2016/0357527 A1* | 12/2016 | Geva | G06F 8/38 |
| 2017/0221156 A1* | 8/2017 | Mingarelli | G06Q 50/01 |

OTHER PUBLICATIONS

Omar Alonso et al, "Clustering and Exploring Search Results using Timeline Constructions", 2009, 10 pages.*

"Workshop on Creating Speech and Language Data with Amazon's Mechanical Turk", Jun. 6, 2010, 238 pages.

Chilton, et al., "Cascade: Crowdsourcing Taxonomy Creation", Apr. 27-May 2, 2013, 10 pages.

Huang, et al., "Text Clustering with Extended User Feedback", Aug. 6-10, 2006, 8 pages.

Scaiella, et al., "Topical Clustering of Search Results", Feb. 8-12, 2012, 11 pages.

* cited by examiner

Query: guitar — 405

Should any of these clusters be merged because they are too similar? Select clusters you think should be merged. — 410

1  2  3  4  5

Should any of these clusters be deleted? Select clusters you think should be deleted. — 420

1  2  3  4  5

Would any of these clusters make better sense if a topic was removed or joined a different cluster? If a topic is deleted then data items related to it in that cluster would also go.

MOVE: Select one or more topics from a cluster that you think should be moved to another cluster.

Topics From Cluster:  1  2  3  Music video game  4  5
                                    Song                       — 435

To cluster: 1  2  3  4  5

DELETE: Select one or more topics from a cluster that you think should be deleted from the cluster.

1  2  3  4  Learning  5
              Education — 440
              Lesson

450

Classical Guitar / Bass Guitar

Bass Guitar | Guitar + | Real Guitar | Guitar Simulator | Guitar Tuner

Chord (music) / Scale (music)

iGuitar | Guitar Songs | EZ Chords | Guitar Chords | Classical Guitar

Music video game / Song

Guitar Legend | Drums vs Guitar | Guitar Solo | Real Drum | Rock Star Guitar Star Learning / Education / Lesson — 460

Basic Guitar Lessons | Guitar 4 Beginners | Guitar Lessons | Guitar 4 Dummies | Scales & Chords Rhythm / Beat (music) / Melody

FIG. 4E

CROWDSOURCED EVALUATION AND REFINEMENT OF SEARCH CLUSTERS

RELATED APPLICATION

This application is a non-provisional of, and claims priority to, U.S. Provisional Patent Application No. 62/267,724, filed Dec. 15, 2015, entitled CROWDSOURCED EVALUATION AND REFINEMENT OF SEARCH CLUSTERS, which is incorporated herein in its entirety.

BACKGROUND

Clustered search results can provide logical structure for queries that return a large number of responsive items. But automated clustering (e.g., algorithm-generated) does not always produce high quality clusters. Manual evaluation and refinement of clustering results by experts increases quality but is slow and does not scale to large numbers of queries.

SUMMARY

Implementations provide an improved system for evaluating and refining clustered search results in a scalable manner. The system first generates cluster sets (i.e., different sets of clustered search results) for a query using a variety of clustering algorithms. The system may present the different sets of clusters to each of a set of crowdsource workers, randomizing the order in which the sets are presented to different crowdsource workers. The system includes a user interface that obtains an evaluation from the crowdsource worker for each cluster set independently of other sets. In other words, the evaluation focuses on the quality of a particular cluster set rather than directly comparing two cluster sets.

The system calculates a score for each cluster set based on the evaluation, including ratings given, the time spent providing the ratings, additional information accessed, etc. The score may be weighted by various factors. The system determines, based on the score across several worker responses, which clustering algorithm produced the best set of clusters for the query.

The best cluster set may then undergo refinement. During refinement, crowdsource workers may suggest changes to the cluster set via a series of refinement tasks. Refinement tasks can include, for example, merging two clusters that are too similar, deleting a cluster that doesn't seem to fit with the others, deleting an entity/topic from a cluster, deleting a particular search item from a cluster, and moving an entity or search item from one cluster to another cluster. If the suggested refinement meets an agreement threshold for the tasks, the system may automatically make the refinement by changing the cluster definition and/or may report the refinement to an expert.

According to one aspect, a method for generating clustered search results includes, for each of a plurality of crowdsource workers, initiating display of a first cluster set from a plurality of cluster sets to the crowdsource worker, the first cluster set being selected at random from among the plurality of cluster sets, wherein each cluster set represents a different clustering algorithm applied to a set of search items responsive to a query, receiving cluster ratings for the first cluster set from the crowdsource worker, wherein each cluster rating is for a respective cluster in the first cluster set, calculating a cluster set score for the first cluster set based on the cluster ratings, and repeating initiating the display, receiving the cluster rating, and calculating the cluster set score for remaining cluster sets in the plurality of cluster sets, wherein selection of a next cluster set is selected at random. The method also includes storing a cluster set definition for the cluster set with a highest cluster set score, the cluster set definition being associated with the query and using, subsequent to receiving a request for the query, the cluster set definition to initiate display of search items responsive to the query.

According to one general aspect, a system includes at least one processor and memory storing a plurality of cluster sets for a query, each cluster set representing search items responsive to the query assigned to one or more clusters of the cluster set and also storing instructions that, when executed by the at least one processor, cause the system to generate a user interface. The user interface may select, at random, a first cluster set from the plurality of cluster sets. The user interface may also initiate display of the clusters in the first cluster set to a crowdsource worker, receive a cluster rating for each cluster in the first cluster set from the crowdsource worker, receive a cluster set rating for the first cluster set. The user interface may also track time spent by the crowdsource worker on the cluster ratings and cluster set rating, calculate a cluster set score the first cluster set based on the cluster ratings, the cluster set score, and the time spent, and repeat, for remaining cluster sets in the plurality of cluster sets, selecting a next cluster set at random, initiating the display, receiving the cluster ratings, receiving the cluster set rating, tracking time spent, and calculating the cluster set score. The memory may also store instructions that, when executed by the at least one processor, cause the system to determine, using cluster set scores for a plurality of crowdsource workers, a cluster set from the plurality of cluster sets with a highest average cluster set score, and store a cluster set definition for the cluster set with the highest average total cluster set score.

According to one general aspect, a method of generating cluster-based search results includes generating a plurality of cluster sets, each cluster set including search items responsive to a query and each cluster set being generated with a different clustering method. The method also includes providing the cluster sets to a first plurality of crowdsource workers for evaluation, wherein each crowdsource worker may evaluate each cluster set in the plurality of cluster sets independently and in a random order and each crowdsource worker provides an evaluation for each cluster in a cluster set and an evaluation for the cluster set overall, and the evaluations produce a cluster set score that is based on the evaluations of the clusters, the evaluation of the cluster set overall, and time spent performing the evaluation. The method may also include determining a weighted cluster set score for each of the plurality of cluster sets, determining a cluster set from the plurality of cluster sets with a highest weighted cluster set score, providing the cluster set with the highest weighted cluster set score to a second plurality of crowdsource workers for refinement, and storing a cluster set definition for the cluster set with the highest weighted cluster set score subsequent to refinement, wherein the cluster set definition is associated with the query and used to organize a search result for the query.

In another aspect, a computer program product embodied on a computer-readable storage device includes instructions that, when executed by at least one processor formed in a substrate, cause a computing device to perform any of the disclosed methods, operations, or processes disclosed herein.

One or more of the implementations of the subject matter described herein can be implemented so as to realize one or more of the following advantages. As one example, the system provides a way to determine which clustering algorithm produces best clustered query results for individual queries. This provides a better user experience for users who view the results. The evaluation and rating are scalable (e.g., can handle hundreds or thousands of queries) because it relies on crowdsource tasks and not experts. The system maximizes quality by down weighting ratings from crowdsource workers who do not spend sufficient time on the task and/or who do not have sufficient expertise (e.g., familiarity with the query and the search items). The system also maximizes quality by presenting the different cluster sets randomly to different workers to avoid a bias of the worker to spend more time on the first set presented. Also, by asking the worker to evaluate each cluster before evaluating the overall cluster set, the system encourages evaluation of each cluster. The system provides a maximum number of high quality or important search items for each cluster to assist the crowdsource worker in evaluating redundancy between clusters in a cluster set. The system facilitates consensus on refinement of cluster sets, such as merging two clusters in the cluster set, deleting a cluster from the cluster set, or deleting specific topics or search items from a cluster, and may automatically make changes to the cluster set definition when a minimum number of workers recommend the same refinement.

The details of one or more implementations are set forth in the accompanying drawings and the description below. Other features will be apparent from the description and drawings, and from the claims.

BRIEF DESCRIPTION OF DRAWINGS

FIGS. 4A to 4E illustrate an example user interface for refining a cluster set, in accordance with disclosed subject matter.

Like reference symbols in the various drawings indicate like elements.

DETAILED DESCRIPTION

Figure 1:
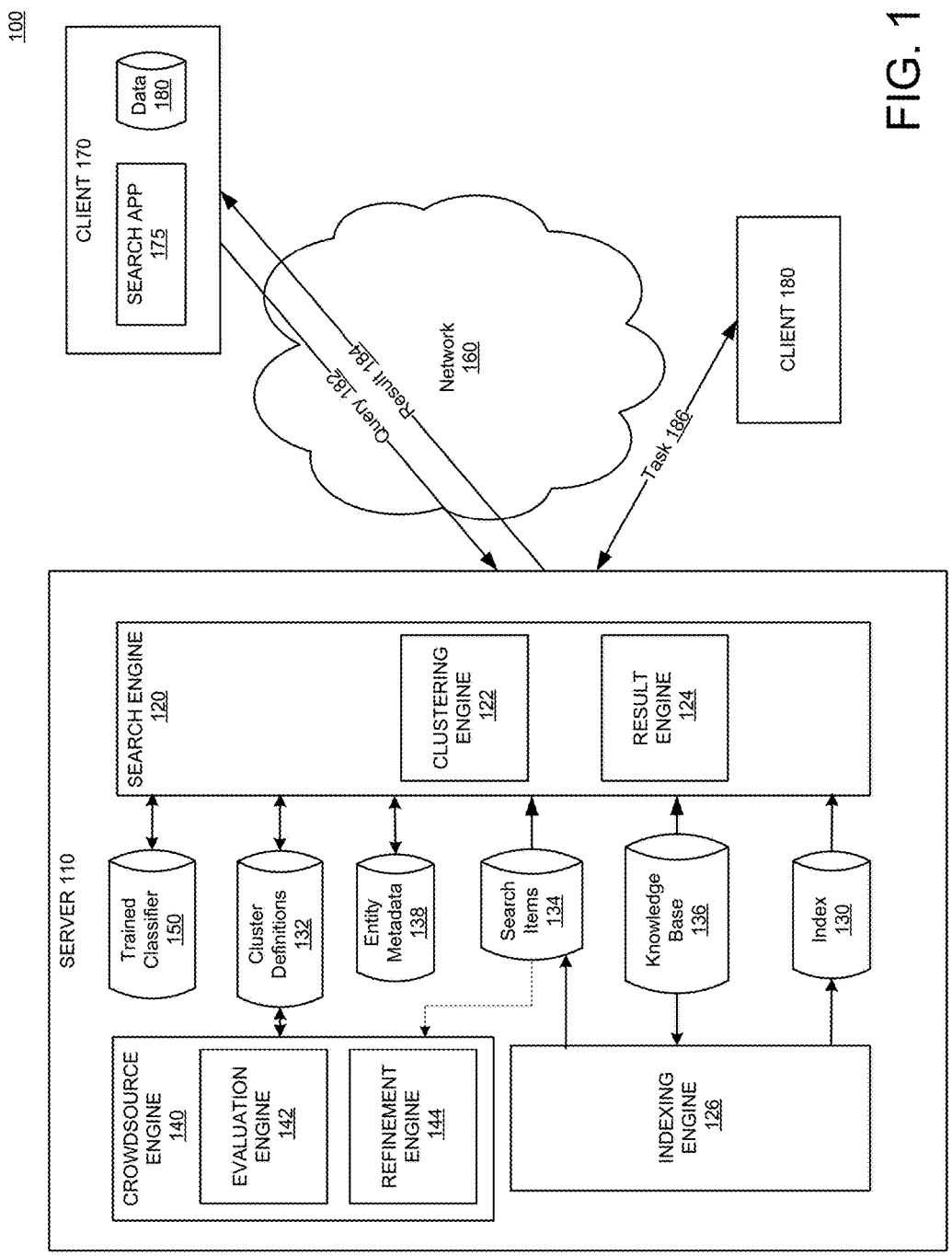
FIG. 1 illustrates an example system in accordance with the disclosed subject matter.

FIG. 1 is a block diagram of a search system in accordance with an example implementation. The system 100 may be used to automatically generate a best clustered search result for a query, which improves the quality of the search results provided by the search system. The depiction of system 100 in FIG. 1 is described as a system for searching for applications, e.g., search items, in a web store. However, other configurations and applications may be used. For example, the search items need not be software applications but can be products sold in a marketplace or documents available over a network, songs in an online music store, images in a gallery, etc. As another example, implementations need not include every element or functionality described with regard to system 100. For example, some systems may use different cluster evaluation and refinement metrics and workflows.

Figure 9:
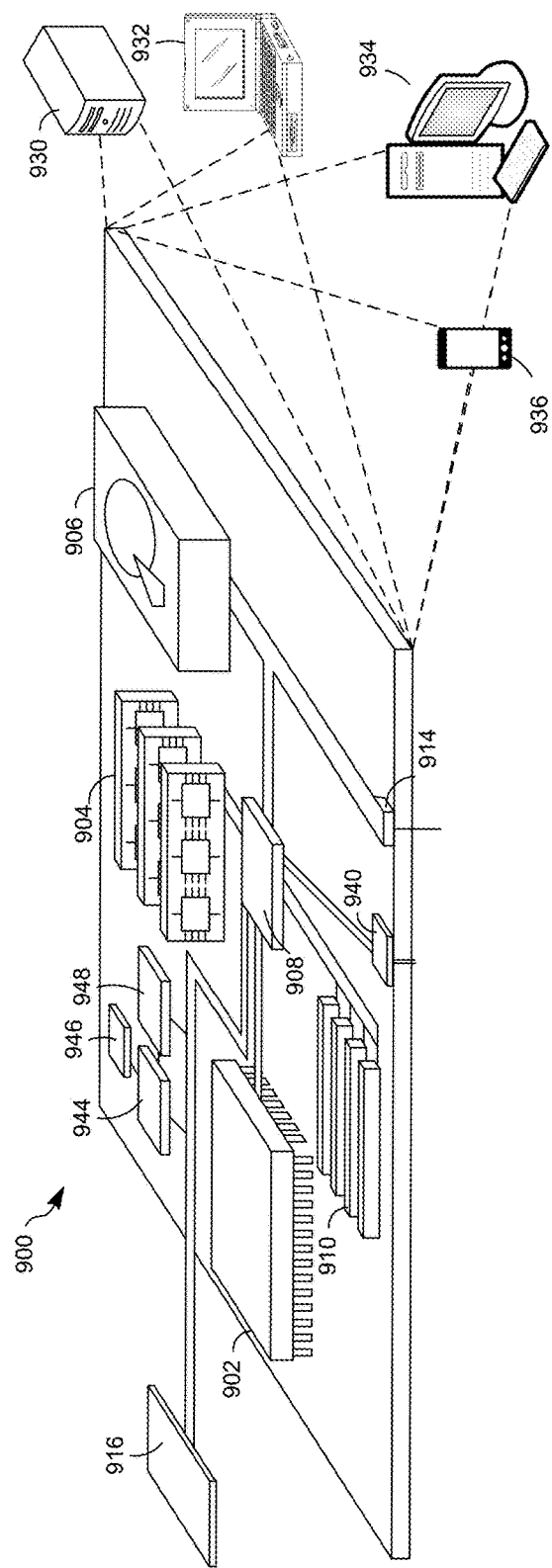
FIG. 9 shows an example of a computer device that can be used to implement the described techniques.
Figure 10:
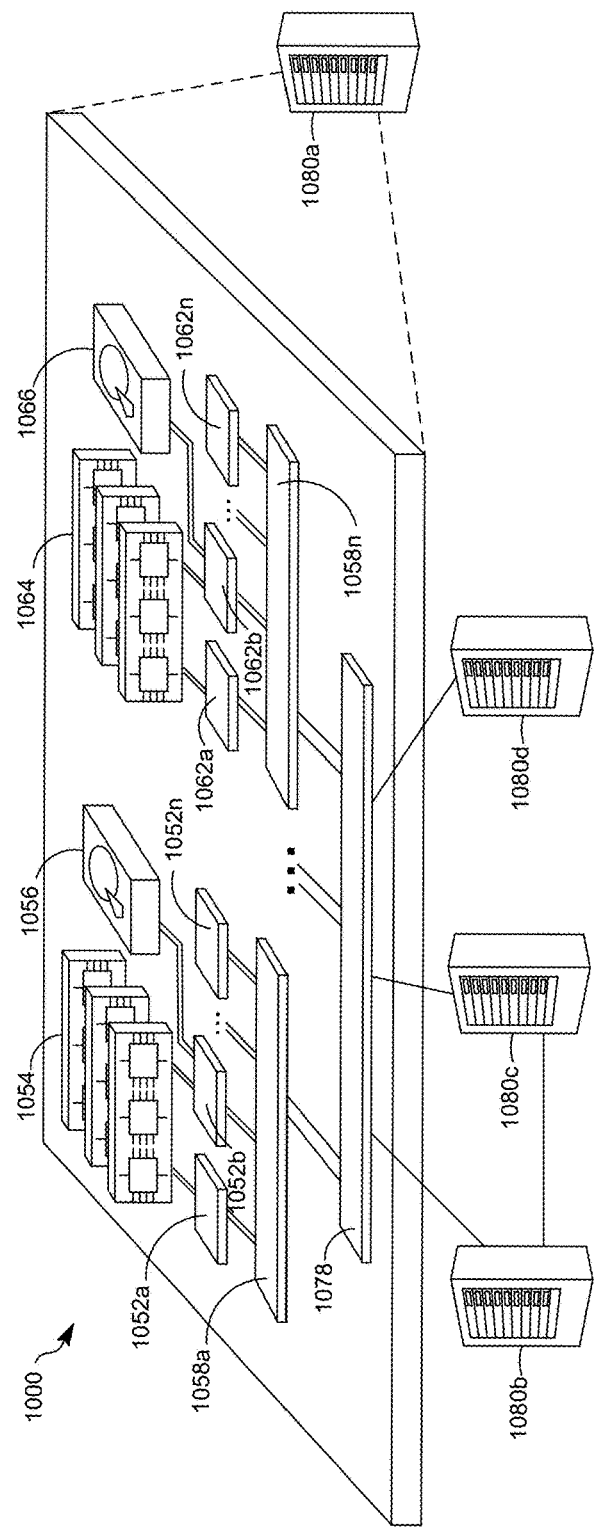
FIG. 10 shows an example of a distributed computer device that can be used to implement the described techniques.

The search system 100 may be a computing device or devices that take the form of a number of different devices, for example a standard server, a group of such servers, or a rack server system, such as server 110. In addition, system 100 may be implemented in a personal computer, for example a laptop computer. The server 110 may be an example of computer device 900, as depicted in FIG. 9 or computer device 1000, as depicted in FIG. 10.

Although not shown in FIG. 1, the server 110 can include one or more processors formed in a substrate configured to execute one or more machine executable instructions or pieces of software, firmware, or a combination thereof. The processors can be semiconductor-based—that is, the processors can include semiconductor material that can perform digital logic. The server 110 can also include an operating system and one or more computer memories, for example a main memory, configured to store one or more pieces of data, either temporarily, permanently, semi-permanently, or a combination thereof. The memory may include any type of storage device that stores information in a format that can be read and/or executed by the one or more processors. The memory may include volatile memory, non-volatile memory, or a combination thereof, and store modules that, when executed by the one or more processors, perform certain operations. In some implementations, the modules may be stored in an external storage device and loaded into the memory of server 110.

The modules may include an indexing engine 126, a search engine 120, and a crowdsource engine 140. The indexing engine 126 may maintain an index 130 of search items 134 for use by the system 100. The search items 134 may be any items in a collection. For example, search items 134 may be documents available over the Internet, documents available on an Intranet, mobile applications, web applications, or plugins available via a web store, songs in an online music store, items for sale via an online marketplace, etc. The indexing engine 126 may process the search items 134 and update index entries in the index 130, for example, using conventional or other indexing techniques.

In some implementations, the indexing engine 126 may use a knowledge base 136 to associate search items 134 with entities in the knowledge base. For example, the search items 134 may include an annotation, description, or other text associated with a search item, or the item may itself include text (e.g., when the item is a document). The indexing engine 126 (or another module not shown) may identify an entity mentioned in the annotation, description, or other text associated with the search item, and may map the search item to that entity. The mapping may be stored in the index 130, in entity metadata 138, or as cluster definitions 132, for example. Each search item in search items 134 may map to one or more entities in the knowledge base 136. In some implementations, only a predefined number of entities are mapped to a search item, e.g., a maximum of 5 entities are mapped to a search item. In some implementations, the mapping may be based on a relevance score, for example, indicating the relevance of the entity to the search item and only the most relevant entities (e.g., those with a relevance score meeting a threshold) are mapped to the search item. In some implementations, the server 110 may include other modules or processes (not shown) that update and maintain the knowledge base 136 and the entity-to-search item mappings.

In some implementations, the indexing engine 126 may generate an embedding for the search item that maps the search item and entities onto an embedding space. For example, the system 100 may give all entities mapped to a search item a score ranging from 0 to 1, with 1 representing the highest relevance between the search item and the entity. The system may use a machine learning algorithm to generate an embedding for the search item using these scores. In the embedding space, each search item and entity is represented as a point in high-dimension space. The system 100 may use this embedding space to determine similarity between search items or entities by using the distance between points. The distance refers to how closely related two objects (search items or entities) are.

The search system 100 may include knowledge base 136. A knowledge base conventionally stores information (facts) about entities. Entities may represent a person, place, item, idea, topic, abstract concept, concrete element, other suitable thing, or any combination of these, and may be represented by a node in the knowledge base. Entities in the knowledge base may be related to each other by edges. The edges may represent relationships between entities, i.e., facts about entities. For example, the data graph may have an entity that corresponds to the actor Humphrey Bogart and the data graph may have an acted in relationship between the Humphrey Bogart entity and entities representing movies that Humphrey Bogart has acted in. In some implementations, the facts may be stored in a tuple, such as <Humphrey Bogart, acted in, Maltese Falcon>. In some implementations the knowledge base 136 may also store some facts about an entity as attributes of the entity. For example the knowledge base 136 may include a birth date for the entity Humphrey Bogart. The attribute may also be considered a labeled relationship for the entity, linking the entity to an attribute value. Thus knowledge about an entity may be represented as labeled relationships between entities and labeled relationships for an entity. A knowledge base with a large number of entities and even a limited number of relationships may have billions of connections. In some implementations, knowledge base 136 may be stored in an external storage device that is accessible from server 110, for example via a network connection. In some implementations, not all entities represented in the knowledge base 136 relate to the search items 134.

In some implementations, the knowledge base 136 or entity metadata 138 may include entity ontology relationships. For the purposes of this disclosure, an entity ontology is a set of relationships that link entities as either synonyms or as parent-child. In other words, in an entity ontology, an entity may be related to one or more other entities as a synonym or a hypernym, i.e., as the parent of the other entity, or as a child of the other entity. The entity ontology can be stored as named relationships in the knowledge base 136 (e.g., an edge representing a synonym, ontologic child, or ontologic parent between entities. In some implementations, the entity ontology may be stored in entity metadata 138. In some implementations, the entity ontology, or in other words the synonym and parent/child relationships, may be curated by hand, automatically generated, or a combination of these. For example, the system 100 may be provided with a subset of entities from the knowledge base 136 that are relevant to the search items 134. In a small knowledge base 136, the subset may be all entities, but in a large knowledge base 136 (e.g., millions of entities), the subset may represent entities that are mapped to the search items in search items 134. In some implementations the subset may be the entities mapped most often to search items, e.g., entities mapped to a plurality of search items may be selected over those that map to only one search item. The entity ontology may be generated based on these subsets.

The modules may also include search engine 120. The search engine 120 may be configured to use the index 130 to identify search items 134 that are responsive to a query 182 and to provide a search result 184 in response to the query 182. The search engine 120 may include a result engine 124 that may parse the query 182 for keywords and may use the keywords to identify search items from search items 134 that are responsive to the query 182 using index 130 and conventional or later discovered techniques. The search engine 120 may also include a ranking engine that orders the search items responsive to the query. The search engine 120 may also include clustering engine 122. Once responsive search items are discovered, the clustering engine 122 may use cluster definitions 132 to cluster the responsive search items prior to arrangement of the responsive search items in the search result 184.

Clustering the responsive search items improves the user experience by providing a natural logical structure within the responsive search items in order to maintain and display diversity represented by responsive items. There are many clustering methods that can be used to cluster search results. But because relationships between search results and between the search result and the query can differ between queries, there is not one clustering method that produces consistently good results for every query. Thus, reliance on a singular clustering method does not produce optimal results for every query. Furthermore, automatically generated clusters can result in clusters with poor quality, e.g., with results that are not coherent or with clusters that are not distinct. Thus, reliance on automatically generated cluster definitions can produce poor results from the user's perspective. Thus, while the clustering engine 122 may automatically cluster the responsive search items, the clusters may require evaluation and refinement. Such tasks can be done by experts, but such a process is slow and does not scale to large numbers of search queries, limiting its use for large-scale search systems.

Accordingly, the clustering engine 122 may use a plurality of different clustering methods to generate a plurality of cluster sets for a particular query. In other words, the system 100 may use many different clustering methods in parallel to produce different candidate cluster sets. One clustering method may include merging clusters based on entity ontology, forming clusters of search items mapped to one entity first and then merging the most similar entity clusters. In some implementations, the system may then apply distance-based clustering to generate the clusters in the cluster set. Cluster similarity may be based on an embedding similarity, although other conventional similarity measures can be used. For example, using a mapping of search items to entities, the system 100 may train an embedding model, e.g., a WALS (weighted average least squares) model, to map search items and entities into an embedding space. The embedding similarity between two search items can be represented as the cosine similarity within the embedding space. In this particular example, when two entities are ontologically related (i.e., synonyms, hypernyms, or co-hypernyms) the two entities are a candidate pair for further clustering. Candidate pairs may be evaluated for similarity (e.g., using embedding similarity or another similarity measure), and the pairs with the highest similarity are evaluated for merging first. In some implementations, the clustering method may perform a first stage by clustering based on entity ontology merging most similar clusters first and a second stage of clustering that applies a distance-based clustering, such as hierarchical agglomerative clustering, to generate a candidate cluster set. The distance-based clustering may merge the most similar clusters, e.g., based on the embedding space distance. The cluster set generated from this method may represent a first candidate cluster set that can be provided to the crowdsource engine 140.

In addition to the two-stage clustering method described above, the clustering engine 122 may also perform a second two-stage clustering method. The second stage of this two-stage clustering method may be the same as the second stage discussed above, namely using a distance based clustering method to generate final clustering results. The first stage may be similar to the first stage discussed above, in that it is based on the entity ontology. The difference in this second two-stage clustering method is that smaller clusters are merged together first, rather than the most similar clusters. For example, the clustering engine 122 may find clusters that are related based on ontology, such as synonyms, hypernyms, or co-hypernyms, and may merge the smallest clusters together. After the first stage that merges smallest ontologically-related clusters together, the clustering engine 122 may then perform additional rounds of clustering using distance clustering, e.g., hierarchical agglomerative clustering, as described above. The cluster set that results from this method may represent a second cluster set that is provided to the crowdsource engine 140. Both the first cluster set and second cluster set are generated using the same pool of search items (e.g., those responsive to the same query).

In some implementations, the clustering engine 122 may also perform other clustering methods in parallel with the two two-stage clustering methods described above. For example, the clustering engine 122 may perform distance-based clustering that favors cluster results that pair related entities (e.g., synonyms, hypernyms, or co-hypernyms). The cluster set generated using this method may be considered a third cluster set provided to the crowdsource engine 140. In some implementations, the clustering engine 122 may perform distance-based clustering to generate a fourth cluster set that is provided to the clustering engine 122. The distance-based clustering may use embedding similarity, as indicated above, but disregard entity ontological relationships. The clustering engine 122 may also use other clustering methods not discussed, which generate additional cluster sets or alternative cluster sets provided to the crowdsource engine 140. The clustering methods selected may be based on appropriateness of application to the search items 134. In some implementations, the clustering parameters may include a maximum number of clusters to form in the set.

The use of several different clustering methods in parallel provides flexibility for the output of the crowdsource engine 140 to determine the best cluster set for any particular query. For example, using two-stage clustering may achieve higher coverage for queries that have fragmented results (e.g., results covering many different entities, each only related to a few search items) but may result in incoherent clusters in other queries. Crowdsource engine 140 provides the opportunity for crowdsource workers to evaluate the different cluster sets and determine which set provides the optimal result for a particular query.

The system 100 also includes a crowdsource engine 140. The crowdsource engine 140 facilitates evaluation and refinement of cluster definitions 132 that are generated by clustering engine 122. By using crowdsource tasks, the system 100 can evaluate and refine clustered search results for large numbers of search queries. The methods used by crowdsource engine 140 produce a clustered search result of similar quality to a result curated by experts. The crowdsource engine 140 takes as input a plurality of cluster sets generated by the clustering engine 122 for a particular query and provides a refined, best cluster set for the query. The crowdsource engine 140 may store the definition of the best cluster set in cluster definitions 132. In some implementations, the clustering engine 122 may store a definition for each generated cluster set in cluster definitions 132 marked as candidate cluster definitions for a particular query and the crowdsource engine 140 may mark one of the definitions as a best result for the query. In some implementations, the crowdsource engine 140 may delete all other cluster definitions that are not a best result. In some implementations, the crowdsource engine 140 may change the definition of a best cluster set during the refinement process. Once the crowdsource engine 140 has selected and refined the best cluster set for the query, when the search engine 120 receives that query, the result engine 124 can use the cluster definitions 132 to quickly generate a high-quality clustered search result for presentation to the requestor.

The crowdsource engine 140 may include an evaluation engine 142 and a refinement engine 144. The evaluation engine 142 may include tasks for a crowdsource application to select a best cluster set from the plurality of cluster sets. Crowdsourcing applications, such as MECHANICAL TURK and others, enlist the assistance of humans to verify or supply information. In this setting, the system 100 may use a conventional or other crowdsourcing application to evaluate each cluster set in the plurality of cluster sets to determine which cluster set is deemed the best. A first set of crowdsource workers may perform the evaluation of cluster sets. Once a best cluster set has been selected based on the worker evaluations, the refinement engine 144 may generate crowdsource tasks to determine whether the best cluster set definition should be altered. During refinement, for example, the crowdsource workers may be asked if clusters should be combined or deleted and whether topics or search items should be deleted from a cluster or moved to another cluster. Crowdsource workers may be asked to provide a title for each cluster based on the topic (i.e., entities) included in the cluster. The refinement tasks may be performed by a second set of crowdsource workers which differs from the first set. The function of the evaluation engine 142 is discussed in further detail with regard to FIGS. 3 and 7 and the refinement engine 144 is discussed in further detail with regard to FIGS. 4A to 4E and 8.

Figure 2:
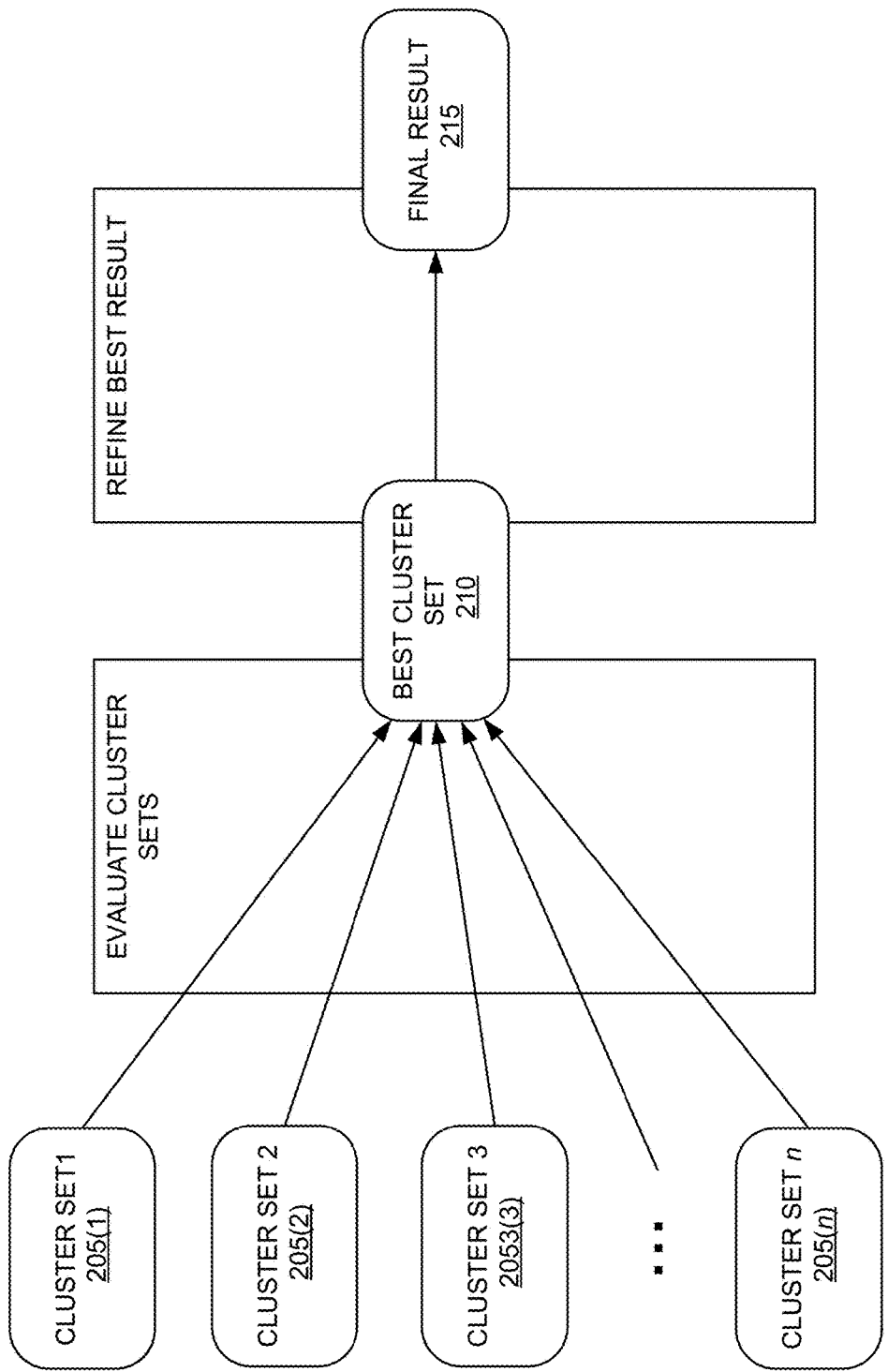
FIG. 2 illustrates a block diagram of a workflow for evaluating and refining clustered search results, in accordance with disclosed subject matter.

FIG. 2 illustrates a block diagram of a workflow for evaluating and refining clustered search results, in accordance with disclosed subject matter. The workflow may be performed by the crowdsource engine 140. The crowdsource engine 140 may take in a plurality of cluster sets, e.g., cluster set 205(1) to 205(n) where n is any non-zero integer. The cluster sets 205(1) to 205(n) may be generated in parallel by the clustering engine 122 and may represent different ways to cluster search items responsive to a query. In some implementations the cluster sets 205(1) to 205(n) may each have a cluster definition, so that the items in a particular cluster of a cluster set are determined by applying the cluster definition to the set of search items. In some implementations the definitions may be attribute-based. In other words, each cluster may be defined by attributes, such as a set of entities/topics, and search items associated with any of the attributes in the definition are included in the cluster. In other implementations, the search items may be directly assigned to a cluster in the cluster definition.

The evaluation engine 142 may direct a series of crowdsource tasks that will allow the crowdsource engine 140 determine which of then cluster sets is a best cluster set 210 for the query. The tasks may include providing each cluster set 205 to the crowdsource worker independently and asking the crowdsource worker to evaluate the cluster set. For example, the crowdsource worker may evaluate each cluster in the set as well as the overall set itself. The crowdsource engine 140 may display the cluster sets 205 in a random order to a plurality of crowdsource workers so each cluster set is presented first to at least some of the crowdsource workers from the plurality of workers. The crowdsource engine 140 (or evaluation engine 142) may track how long the crowdsource worker spends on each cluster set and track whether the crowdsource worker views additional information about search items in the various clusters. If a crowdsource worker spends too little time evaluating a cluster set, the evaluation given by the crowdsource worker may be discounted or thrown out. The crowdsource engine 140 may determine the best cluster set 210 by consensus of the plurality of crowdsource workers, as explained in more detail below.

The refinement engine 144 may direct a series of crowdsource tasks that will allow the crowdsource engine 140 to refine the best cluster set 210 to produce a final result 215. The final result 215 may include a revised cluster set definition as well as issues for further investigation by an expert, such as individual search items that may be incorrectly associated with an entity or other attribute used to generate clusters. The final result 215 may also include a suggested title for each cluster in the best cluster set. The final result 215 may be used to update the cluster definitions 132 and/or to produce a report or other interface that enables an expert to identify other ways of potentially refining the best cluster set.

Returning to FIG. 1, the system 100 may include a trained classifier 150. A trained classifier is used to represent things, such as search items, in a feature vector, also known as an embedding. A classifier, such as a WALS model, can be provided features for an item and the classifier generates an embedding that represents the item. Other items may be mapped onto the embedding spaces by the trained classifier, or in other words the trained classifier 150. The trained classifier 150 may thus map a search item or an entity onto an embedding space using conventional or later discovered techniques. The embedding for a search item may then be used as a measure for similarity with another search item. Likewise, the embedding for an entity mapped to an embedding space may be used as a similarity metric for determining similarity with another entity.

The system 100 may also include cluster definitions 132. In one implementation, the cluster definitions 132 may represent the mapping of an entity to one of the clusters in the cluster set. Because search items may map to one or more entities, a cluster includes the search items that map to a specific entity within the cluster and a particular search item may end up in more than one cluster. The entities in a cluster may be considered topics for the cluster. The system 100 may compute these cluster definitions 132 independently of receipt of a particular user query so that they can be evaluated and refined by the crowdsource engine 140. If the search engine 120 receives a query that does not have a cluster definition, the system 100 may generate cluster definitions 132 at query time and select one of the sets for the search result. The crowdsource engine 140 may then be used to select and refine a best cluster set for this query. Thus, in some implementations, receipt of a query without an associated cluster definition 132 may trigger operation of crowdsource engine 140. In some implementations, the cluster definitions 132 may be determined by another mapping, for example mapping search items directly to clusters or mapping search items to some other attribute that is used to generate clusters.

Search system 100 may be in communication with client(s) 170 and 180 over network 160. Clients 170 may allow a user to provide query 182 to the search engine 120 and to receive search result 184, which organizes responsive search items by cluster assignment based on the cluster definitions 132. Clients 180 may allow a crowdsource worker to receive a task 186 and provide input for the task 186. In some implementations the client 180 may be in communication with another server (not shown) that is in communication with server 110. Network 160 may be for example, the Internet or the network 160 can be a wired or wireless local area network (LAN), wide area network (WAN), etc., implemented using, for example, gateway devices, bridges, switches, and/or so forth. Via the network 160, the search system 100 may communicate with and transmit data to/from clients 170 and 180. In some implementations, search system 100 may be in communication with or include other computing devices that provide updates to the knowledge base 136 and search items 134.

Search system 100 represents one example configuration and other configurations are possible. In addition, components of system 100 may be combined or distributed in a manner differently than illustrated. For example, in some implementations one or more of the search engine 120, the indexing engine 126, the clustering engine 122, the result engine 124, the crowdsource engine 140, the evaluation engine 142, and the refinement engine 144, may be combined into a single module or engine. In addition, components or features of the search engine 120, the indexing engine 126, the clustering engine 122, the result engine 124, the crowdsource engine 140, the evaluation engine 142, and the refinement engine 144 may be distributed between two or more modules or engines, or even distributed across multiple computing devices. For example, in some implementations, the crowdsource engine 140, the evaluation engine 142 and/or the refinement engine 144 may be located on or in communication with a server that runs or hosts a crowdsource application. Thus, for example, the cluster sets may be provided to a server running the crowdsource application, which may in turn provide results of the crowdsource tasks to the server 110 for evaluation/action by one or more components of the crowdsource engine 140.

Figure 3:
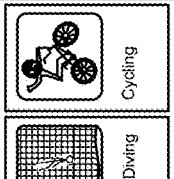
FIG. 3 illustrates an example user interface for evaluating a cluster set via a crowdsource task, according to an implementation.

FIG. 3 illustrates an example user interface 300 for evaluating a cluster set via a crowdsource task, according to an implementation. The user interface 300 may be directed by a crowdsource engine in a search system, such as crowdsource engine 140 and/or evaluation engine 142 of FIG. 1. The user interface 300 illustrates presentation of one cluster set 310 of the plurality of cluster sets for the query 305 stickman. In other words, the search items illustrated in user interface 300 are all responsive to the query stickman and have been assigned to one or more of the clusters in cluster set 310. There are additional cluster sets for the query stickman that the system would present to the crowdsource worker in a similar user interface, but the system presents each cluster set independently of the others. Put another way, the crowdsource worker is asked to evaluate each cluster set on its own without comparing one cluster set directly with another cluster set. In the example of FIG. 3, the cluster set 310 includes a sport games cluster 315, an action games cluster 320, and an arcade games cluster 325. As illustrated, a search item may be in more than one cluster. For example, the Stickman Race search item appears in both the sport games cluster 315 and the action games cluster 320.

A crowdsource worker needs quite a bit of information to properly evaluate a cluster set but the requisite information can overwhelm the display. The user interface 300 provides the information succinctly so that the crowdsource worker is not overwhelmed. First, the user interface 300 may display a small subset of search items included in each cluster and provide a control 370 that enables the crowdsource worker to view the additional search items in the cluster. The search items selected for initial display (i.e., the subset) may be selected as the most relevant to the query, the most popular (e.g., the most downloaded mobile apps), or by some other indicator of importance appropriate for the search items. For example, FIG. 3 illustrates showing five mobile applications in the initial subset. To provide additional information, the user interface 300 may include a pop-up window 360 that displays additional information about a search item when the crowdsource worker hovers an input control, such as a mouse cursor or a finger, over the search item. In some implementations, the pop-up window 360 may appear when the input control hovers over an icon for the search item, as illustrated in FIG. 3. The pop-up window may include a description of the search item so that the crowdsource worker can become familiar with an unfamiliar search item to better determine cluster coherence and distinctness. In some implementations, the window 360 may include additional information about the search item, such as application metadata that may be useful for evaluating clusters.

In some implementations, the window 360 may include a link to more information about the search item. For example, for a mobile application the link may navigate to a web store page where the mobile application can be downloaded. In some implementations, clicking on the search item in user interface 300 may navigate to the link. The crowdsource engine 140 may record whether or not any pop-up windows, e.g., window 360, are viewed by the crowdsource worker, whether the viewed windows are in different clusters, as well as the number of such informational window views for each cluster etc. In other words, the crowdsource engine 140 may track the time the crowdsource worker hovers over search item icons. The crowdsource engine 140 may use such metrics to determine whether the crowdsource worker has given sufficient consideration to the cluster set. In some implementations, if the crowdsource worker does not hover over any search items the system may discard or discount any evaluation of the cluster set by the crowdsource worker as the worker did not give sufficient time to the task. In some implementations, the system may require that the crowdsource worker hover over a minimum number of search items or spent a minimum amount of time hovering; otherwise the evaluation of the cluster or cluster set may be discarded or down weighted.

The user interface 300 may include a cluster rating section 330. The cluster rating section 330 may include input controls that allow the crowdsource worker to provide a cluster rating for each cluster. For example, the input control 335 enables the crowdsource worker to rate the sport games cluster 315 as good or bad (i.e., a binary value). Of course other controls with more values may be used. Input control 340 enables the crowdsource worker to provide a cluster rating for the action games cluster 320 and the input control 345 enables the crowdsource worker to provide a cluster rating for arcade games cluster 325. Allowing the crowdsource worker to evaluate all clusters in the cluster set together provides the crowdsource worker with the opportunity to determine whether search items or topics are redundant, which is a factor in cluster set evaluation. Moreover, asking for a rating for each individual cluster encourages crowdsource workers to inspect each cluster one at a time before considering the result as a whole.

In addition to the cluster rating section 330, the user interface 300 may include a cluster set rating section 350. The cluster set rating section 350 enables the crowdsource worker to rate the overall set in addition to each individual cluster. The cluster set rating may have more possible values that the cluster ratings. In the example of FIG. 3, the cluster rating is binary, while the cluster set rating has five possible values, e.g., using a 5-point Likert scale. In addition to the cluster rating section 330 and the cluster set rating section 350, the user interface 300 may include qualitative reasoning section 355 that enables the crowdsource worker to enter an explanation of what factors the worker considered as part of the evaluation. The qualitative reasoning section 355 may be used to estimate the quality of worker judgment. For example, the system may dismiss a judgement if the explanation text is too short. As another example, the system may identify references of specific topics or clusters in the text and then give those judgments more weight.

The user interface 300 may include a link or other control (not shown) that enables the crowdsource worker to move to a next cluster set. The crowdsource engine 140 may track how much time the crowdsource worker spends on user interface 300 for a particular cluster set (e.g., from display of user interface 300 to selection of the control that moves to another cluster set). In some implementations, the crowdsource engine 140 may also obtain information regarding how familiar the crowdsource worker is with the query 305. For example, after the crowdsource worker has evaluated all cluster sets for the query 305 the system may ask the crowdsource worker to rate their familiarity with the search query 305 and the search items shown in the clusters. The rating can be another Likert scale, e.g. 3 or 5-point Likert scale. The crowdsource worker familiarity question may be used to weight the cluster ratings and cluster set ratings provided by the crowdsource worker for the cluster sets associated with the query. Thus, for example, the system may weight more heavily responses from a crowdsource worker who rated themselves positively on the Likert scale and may weight more lightly ratings from a crowdsource worker who was not as familiar. In other words, the overall score for a cluster set may be a weighted average of the rating provided by the crowdsource workers for that cluster set, with some ratings receiving more weight and others receiving less weight based on the familiarity rating and/or the time spent on the cluster set.

FIGS. 4A to 4E illustrate example views of user interface 400 for refining a cluster set, in accordance with disclosed subject matter. The user interface 400 may be directed by a crowdsource engine in a search system, such as crowdsource engine 140 and/or refinement engine 144 of FIG. 1. The user interface 400 illustrates presentation of a best cluster set for the query 405 guitar. In other words, the search items illustrated in user interface 400 are all responsive to the query guitar and the clusters in this cluster set have been selected as a best cluster set for the query. The first portion of the user interface 400 may be similar to that of 300, in that it provides a subset of most important search items in each cluster with a control that enables the crowdsource worker to view additional search items. The same hover functionality that displays additional information about a search item in a pop-up window of user interface 300 may also be available in user interface 400. The user interface 400 may also include a section that allows the crowdsource worker to rate each cluster in the cluster set, e.g., as either good or bad. This encourages inspection of each cluster by the crowdsource worker, even if these ratings are not further used by the system.

Figure 4A:

The second portion of user interface 400 may be a refinement task area that includes merge information 410, as illustrated in FIG. 4A. If the crowdsource worker provides any cluster indications in the merge information 410, this is a suggestion that the two (or more) clusters have too much overlap, or are not distinct enough. The crowdsource worker may select two or more clusters via merge information 410. This is a vote from the crowdsource worker to merge the selected clusters. If enough crowdsource workers vote the same way, i.e., there is agreement on the merge refinement by a minimum number or percent of the crowdsource workers, the system may automatically merge the selected clusters into a single cluster, e.g., by updating the cluster set definition. For example, where a cluster set is defined by attributes, the attributes from the two or more selected clusters will be combined into a single cluster. Agreement on the task may be determined based on an agreement threshold. The system may track the amount of time that the crowdsource worker spends on evaluation of the clusters and the cluster set and may disregard any votes by crowdsource workers who did not spend sufficient time analyzing the clusters. Similarly, the system may weigh votes from crowdsource workers who are familiar with the query more than votes from crowdsource workers who are unfamiliar with the query. For example, the system may ask about familiarity using the same method described with regard to FIG. 3. The user interface 400 may provide navigation controls 415 to allow the crowdsource worker to navigate between refinement tasks, e.g., merge information 410, and delete information 420, item move information 430, and topic removal information 440.

Figure 4B:
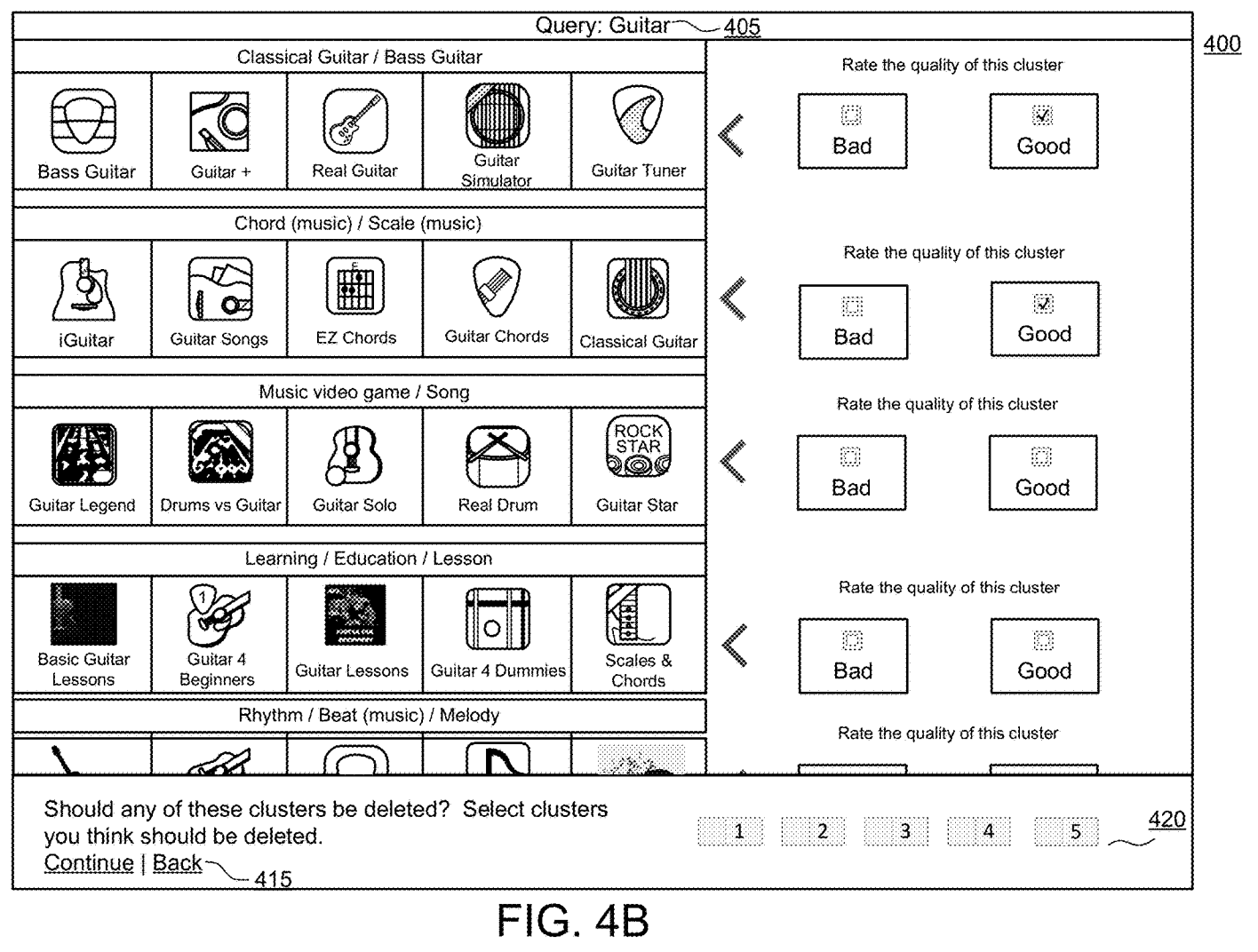

FIG. 4B illustrates a refinement task area that includes delete information 420. When a crowdsource worker selects one or more clusters in the delete information 420, this represents a vote from the crowdsource worker to remove one of the clusters from the cluster set. Removing a cluster will remove all search items from the cluster set and thus the search results for that query, unless the search items also appear in another cluster. If enough crowdsource workers vote for deletion of the same cluster, the system may automatically delete the entire cluster from the cluster set, e.g., by updating the cluster set definition. The system may use a threshold for deciding if enough votes for deleting a particular cluster have been received. For example if 25% of the crowdsource workers vote to delete the cluster, the system may automatically delete the cluster. Of course, the system may use a weighted voting system, where votes from crowdsource workers familiar with the query 405 count more or are weighted more than votes from crowdsource workers who are unfamiliar with the query 405. Similarly, if a crowdsource worker does not spend sufficient time evaluating the queries, the vote may be down weighted or disregarded.

Figure 4C:
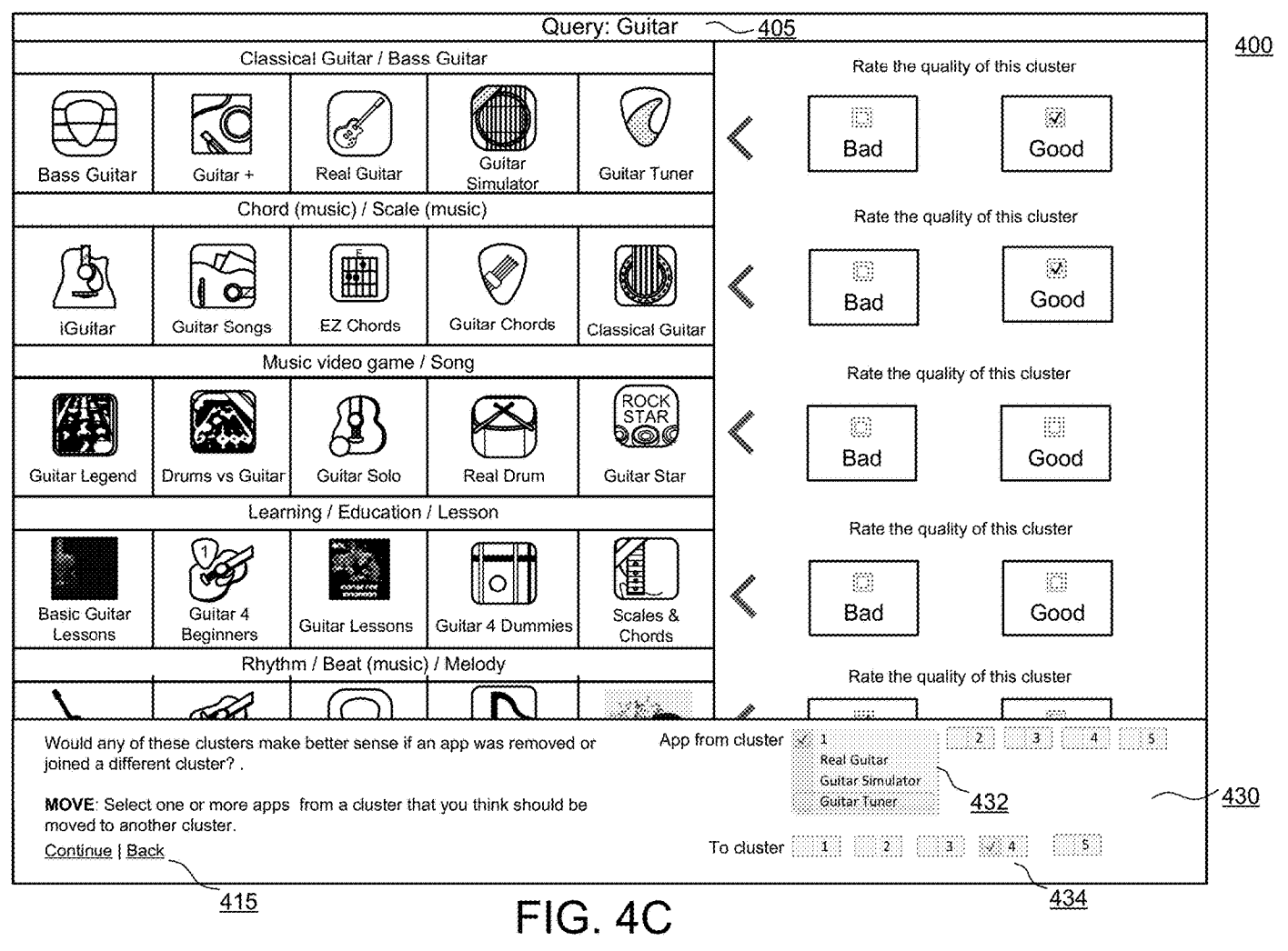

FIG. 4C illustrates a refinement task area that includes item move information 430. The user interface 400 may enable a crowdsource worker to select specific search items that seem to be out of place within the cluster. In the example of FIG. 4C, the user interface 400 enables a crowdsource worker to move a search item from one cluster to another cluster. For example, the crowdsource worker may select a search item from cluster 1 (e.g., Guitar Tuner) and move it to cluster 4. If a sufficient number of crowdsource workers suggest this same change, i.e., if there is agreement on the app move refinement, the system may automatically move the search item to the suggested cluster, e.g., by updating the cluster definition, or may suggest the move to an expert, e.g., in the form of a report or notification. For example, if clusters are based on attribute assignment (e.g., topics), items are shown in clusters when the item is associated with the topic. Thus, a suggestion to move a specific item to a different cluster may mean that the item is inappropriately associated with the "from" topic. Thus, it may be beneficial to have an expert determine if the metadata for the search item should be updated, or if a cluster definition should be updated. Like other refinement tasks, a vote for moving a search item may be weighted by crowdsource worker expertise for the query 405, by time spent on the task or a combination of these. Although not illustrated, the user interface 400 may also include a refinement task for deleting an individual search item from a cluster.

Figure 4D:
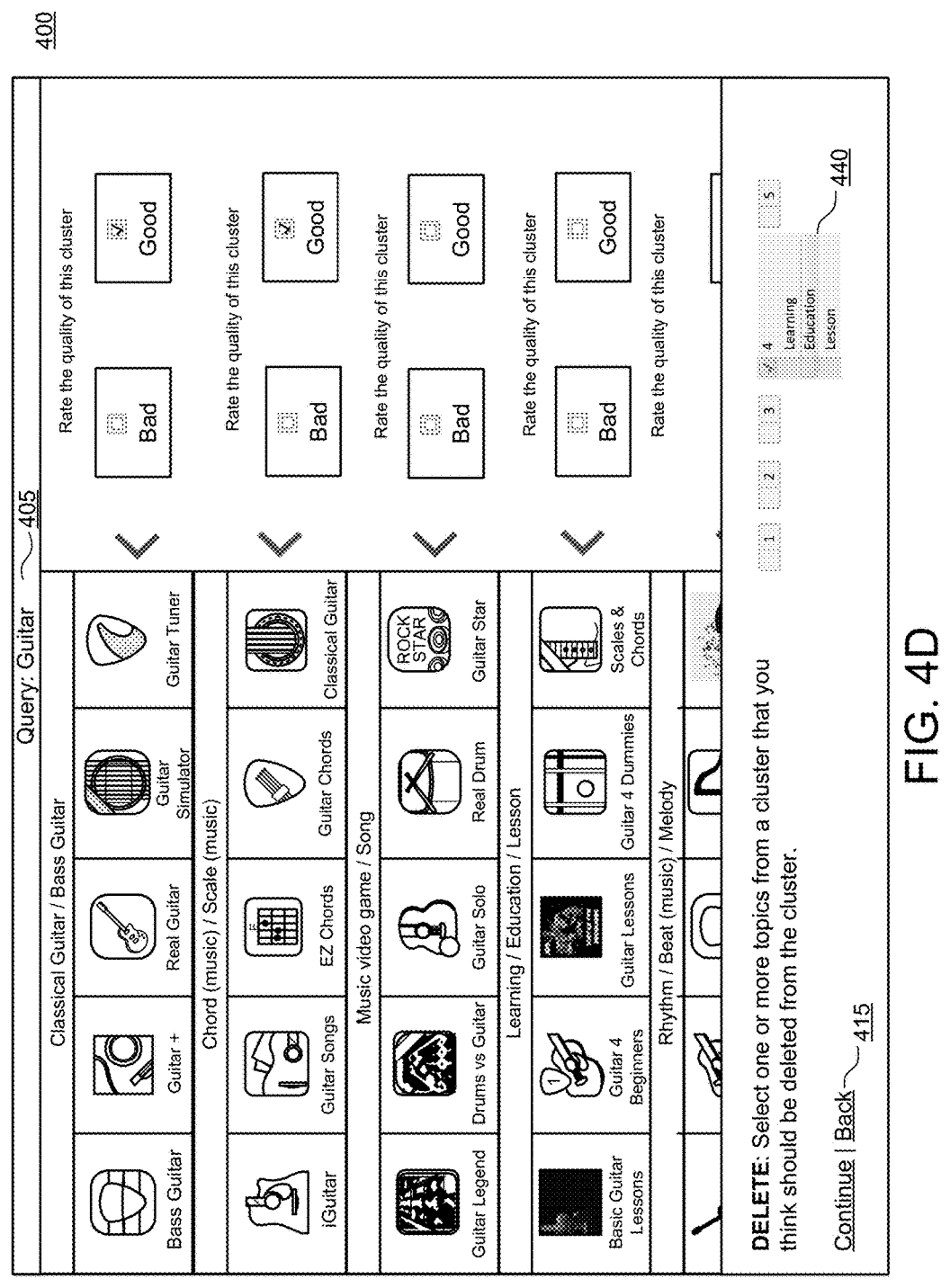

FIG. 4D illustrates a refinement task area that includes topic removal information 440. Topic removal information 440 enables a crowdsource worker to select one or more topics to delete from a cluster. In the example of FIG. 4D, a crowdsource worker has selected the topic Education for deletion from cluster 3. The topic may be an entity or other attribute that is associated with the cluster, e.g., in the cluster definition. Deleting the topic Education from cluster 3 will also remove any search items that are associated with Education and not with topics Learning or Lesson from cluster 3. If enough crowdsource workers select the topic for deletion, i.e., there is agreement by some threshold percent of crowdsource workers for the refinement (such as 20 or 25%), the system may automatically remove that topic (or other attribute) from the cluster definition. In some implementations when the threshold is not met the system may report the topic for further investigation to an expert, e.g., so the expert can decide whether the topic should be removed from the cluster set definition.

FIG. 4E illustrates an alternative user interface 400' that combines the refinement tasks to a combined refinement task area 450. The refinement tasks are the same as those illustrated in FIGS. 4A to 4D, except that FIG. 4E illustrates topic move information 435, rather than item move information 430. The system may use user interface 400' after the crowdsource worker has evaluated the cluster using an interface similar to interface 300 of FIG. 3, for example. Another refinement task that the user interface 400 may include is a title selection task. In title selection, the crowdsource worker may be asked to edit the title, e.g., title 460, for each cluster. Editing the title may include selecting one or two of the topics for the cluster as the title. For example, the user interface 400 or 400' may include a control that enables the crowdsource worker to select one or more of Learning, Education, and Lesson as the title for cluster 4 of FIG. 4E. The crowdsource worker may select Learning and Lesson but not Education. As with the other refinement tasks, if a sufficient number of crowdsource workers select these two topics as the tile, the system may automatically update the cluster definition so that the title is "Learning/Lesson" instead of "Learning/Education/Lesson." When the crowdsource worker has completed all refinement tasks, the system may record the information received from the crowdsource worker for analysis once a minimum number of crowdsource workers have completed the same tasks.

Figure 5:
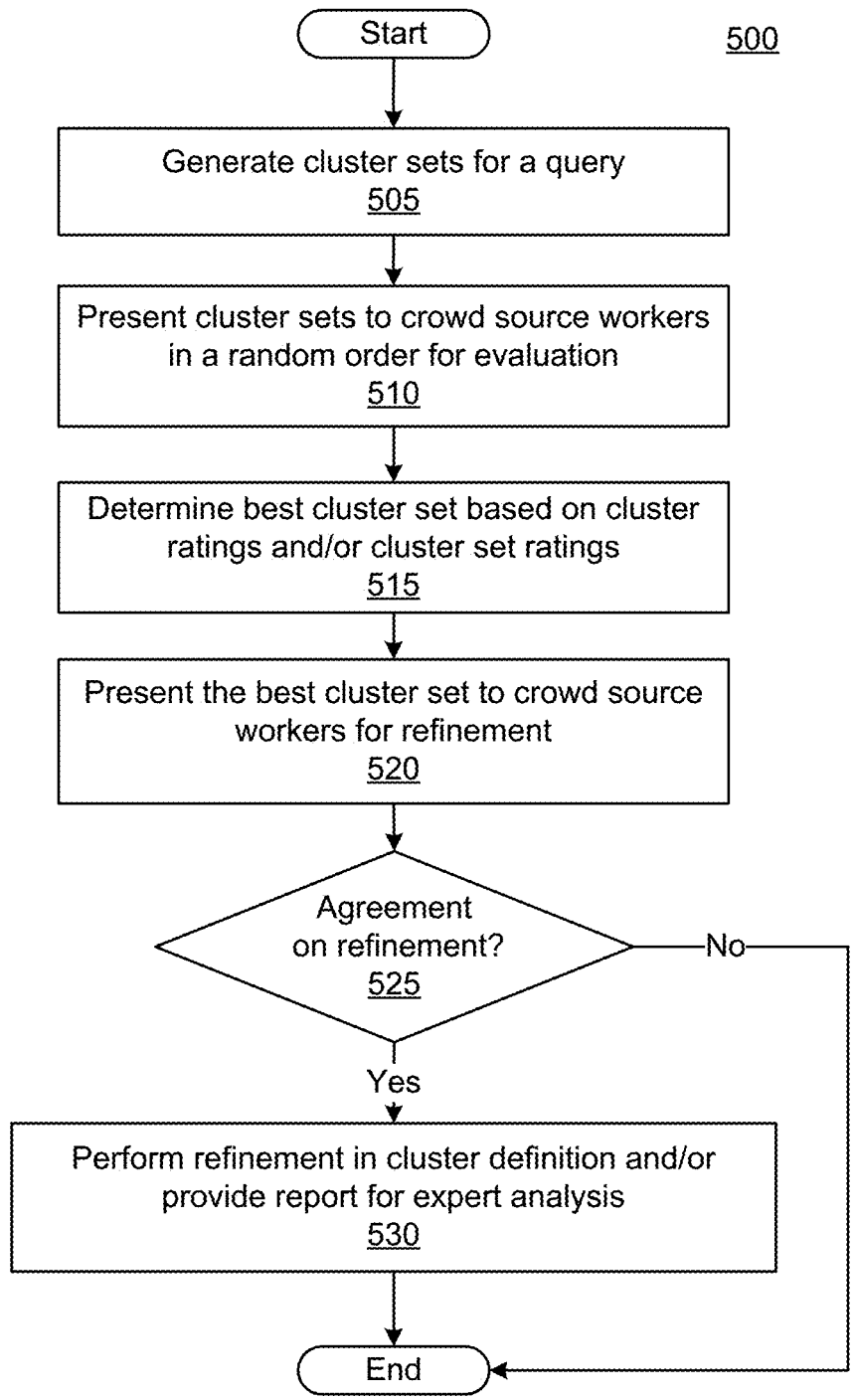
FIG. 5 illustrates a flow diagram of an example process for evaluating and refining clustered search results, in accordance with disclosed subject matter.

FIG. 5 illustrates a flow diagram of an example process 500 for evaluating and refining cluster search results, according to an implementation. Process 500 may be performed by a search system, such as system 100 of FIG. 1. Process 500 is an example of a process for efficiently evaluating cluster sets for a search result of a query that enables the system to provide optimal clustered results for the query. Because the evaluation and refinement of many query results can be done in parallel via crowdsourcing tasks, the method is scalable to a large search system, e.g., with a large repository of search items. Process 500 may begin with the search system generating the plurality of cluster sets for a query (505). The search system may use various clustering methods and parameters to generate the cluster sets. Each cluster set represents a different way to cluster search items that are responsive to the same query. The system may present each of the cluster sets to a plurality of crowdsource workers for evaluation (510). The system presents each cluster set independently of the other sets. FIG. 3 illustrates an example of such a presentation. The system also randomly selects the first cluster set for presentation to a particular crowdsource worker. The random selection of the first cluster set ensures that no cluster sets receive an unduly high evaluation based on its status as the first presented sets. Because crowdsource workers spend more time on and rate more highly the first cluster set they see, randomizing which cluster set of the plurality of cluster sets is presented first ensures no cluster set benefits more than others from this bias. The result of the evaluation of a cluster set is a cluster rating for each cluster and a cluster set rating for the cluster set, as well as additional information, such as the time spent on the task, whether and how often the crowdsource worker viewed additional information for search items in a cluster, crowdsource worker familiarity or expertise for the query, etc. The system may wait for a minimum number of crowdsource workers to finish evaluation tasks before proceeding. For example, the system may wait for at least twenty crowdsource workers to perform the evaluating tasks on a particular cluster prior to proceeding to step 515.

The system determines a best cluster from the plurality of clusters based on the cluster ratings and/or cluster set ratings received from a plurality of crowdsource workers (515). In some implementations the system may require evaluations from a minimum number of crowdsource workers before determining the best cluster set. The system may determine the best cluster set by calculating a weighted average of the cluster ratings for each cluster set, calculating a weighted average of the cluster set rating for each cluster set, or a combination of these. The system may use the time a crowdsource worker spent on review of the entire cluster set, whether or not the crowdsource worker looked at additional details for search items, and the expertise of the crowdsource user, e.g., expressed as familiarity with the query and search items, to weight the ratings. For example, the system may ignore or down weight ratings where a minimum amount of time was not spent on the cluster set, the system may up weight ratings for crowdsource workers who are familiar with the query or the search items, the system may ignore ratings for crowdsource workers who failed to view details for any search items, or the system may down weight ratings from users who did not look at details for a sufficient number of search items, or for at least one search item in each cluster, etc. Whether or not a crowdsource worker viewed details may be tracked by mouse-over events that result in a pop-up window with more details, e.g., window 360 of FIG. 3. The mouse-over event may occur over an icon representing a search item in a cluster. The system may determine the best cluster set as the cluster set that has a highest cluster score. In some implementations, the system may update a cluster set definition for the query to indicate that it has been selected as the best cluster set definition for the query. In some implementations the system may delete any cluster set definitions for the query that are not the best cluster set definition. Whether identified as the best cluster set definition or whether the only cluster set definition remaining for the query, the search system can then begin using the cluster set definition to format search results when that query is received.

Process 500 may also include a cluster refinement process that starts with presenting the best cluster set to crowd source workers for refinement (520). Presenting the best cluster set for refinement may be accomplished using a user interface similar to that described in FIGS. 4A to 4E. Thus, the refinement may include various tasks, and is discussed in more detail with regard to FIG. 8. The system may wait for a minimum number of crowdsource workers to finish the refinement tasks before proceeding. For example, the system may wait for at least twenty crowdsource workers to perform the refinement tasks on a particular cluster prior to proceeding to step 525.

When a sufficient number of refinement responses have been received, the system may determine, for each type of refinement task, whether there is sufficient agreement on the suggested refinements (525). Sufficient agreement may mean that a minimum of the crowdsource workers agree on the refinement (whether based on percentage or numbers). The minimum may be expressed as an agreement threshold and may be different for each refinement task. For example, the system may define an agreement threshold for merging two clusters as 20 percent of the crowdsource workers indicating that the two clusters should be merged, whereas the system may define an agreement threshold for deleting a cluster as 25 percent of the crowdsource workers indicating the cluster should be deleted. Similarly, the system may define the agreement threshold for moving a topic or entity from one cluster to another as 30 percent and may define the agreement threshold for removing a search item from a cluster to be 10 percent. If there is sufficient agreement on a refinement task (525, Yes), the system may perform that refinement on the cluster definition and/or report the refinement to an expert for analysis (530). For example, if the agreement threshold for merging two clusters is met, the system may automatically update the cluster definition. As another example, if the agreement threshold for removing a search item from a cluster is met, the system may notify an expert that the entity (i.e., topic) assignment of the search item is incorrect and may need modification. In some implementations, the system may report any changes automatically made to cluster definitions to an expert. Process 500 then ends, having generated a cluster set definition tailored to the query.

Figure 6:
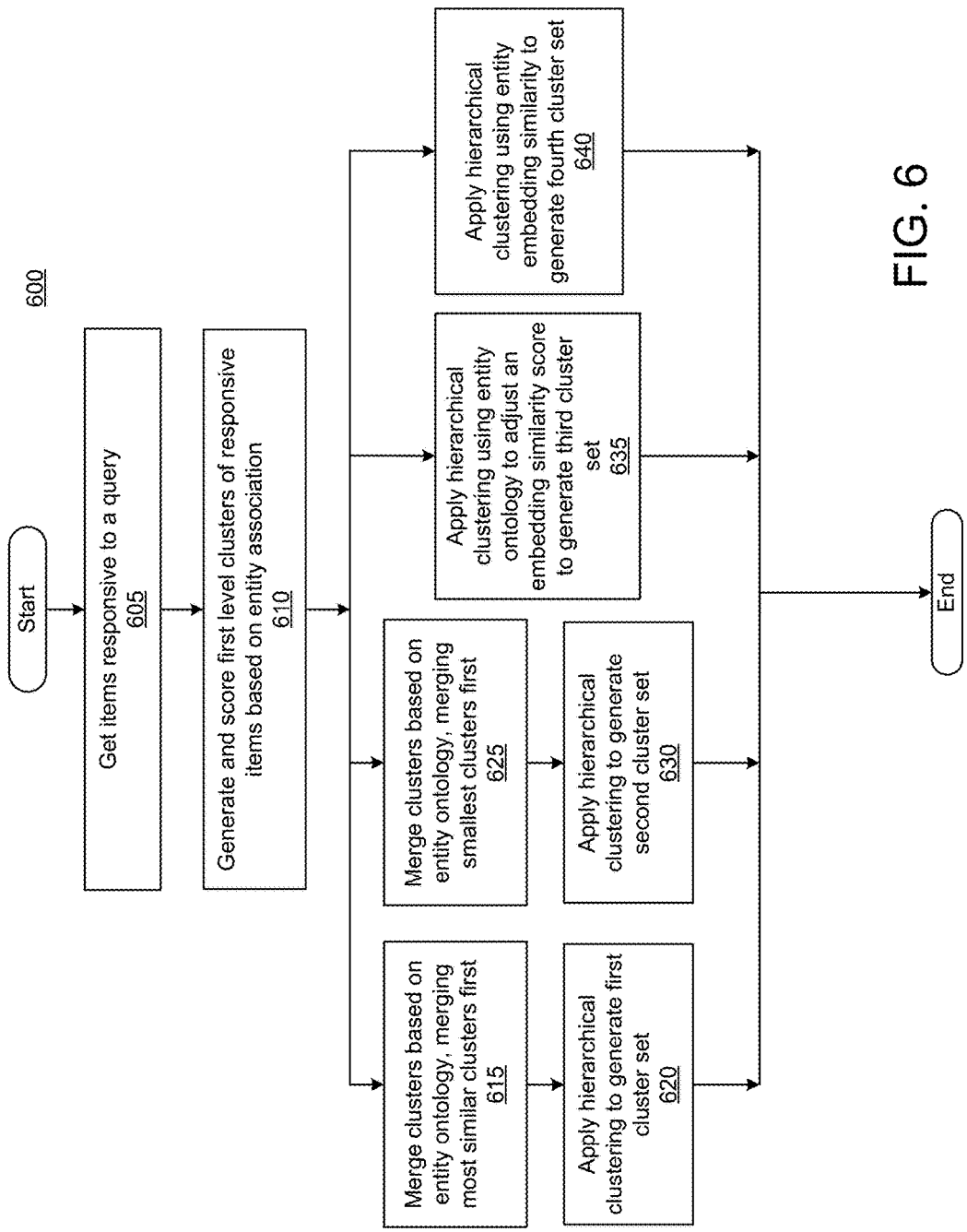
FIG. 6 illustrates a flow diagram of an example process for generating cluster sets, in accordance with disclosed subject matter.

FIG. 6 illustrates a flow diagram of an example process 600 for generating candidate cluster sets, in accordance with disclosed subject matter. Process 600 is one example of forming a plurality of cluster sets and implementations may include other clustering methods not illustrated in the example of FIG. 6. The search system may perform process 600 as part of step 505 of FIG. 5. Process 600 may begin by receiving search items responsive to a query (605). The query may be one submitted by users of the search system for which a best cluster set has not yet been determined. The query may also be a query submitted by administrators of the search system. In some implementations, the search items may be applications available in a web store. Responsive items may be items that are associated with keywords or keyword synonyms from the query using conventional or later discovered techniques. In some implementations, the system may generate first level clusters of responsive items based on entity association (610) or via association of another attribute. Each first level cluster may correspond to a single entity (i.e., topic), and the responsive search items in the cluster may be mapped to or associated with to that entity. The mapping may occur based on entities found in or associated with a description of the item or in other text associated with the item. In some implementations, the mappings may be curated by hand. For example, in an implementation where the search items are applications available in a web store, the application developer may provide one or more entities that the application maps to. In some implementations, the first level clusters may be formed based on a different attribute.

The system may then begin parallel computation of cluster sets using various clustering methods. A first clustering method may be a two-stage clustering method that first merges the first-level clusters based on entity ontology, merging most similar clusters first (615). The entity ontology may relate one entity to another as a synonym, as a parent, as a child, or as the child of the same parent. Thus, in this clustering method, only a synonym entity, a parent entity, a child entity, or a sibling entity can be considered for merging, e.g., be a candidate pair. From among the candidate pairs, the system may select a candidate pair that has a highest similarity among the pairs. In some implementations, the cluster similarity may be based on an embedding space, e.g., that maps apps and entities to the embedding space. Similarity may be the cosine similarity within the embedding space. In some implementations, the cluster similarity may be based on similarity of users. For example, web applications may be downloaded and installed by many of the same users, and the more overlap between users the more similar the clusters are. In some implementations, cluster similarity may be based on the number of cluster members that appear together in the top search results for a number of similar queries. Of course, implementations may work with other similarity metrics, and the examples above are exemplary.

Clustering in the first stage may be performed in rounds to determine the best clustering arrangement in a particular round. For example, if clusters A, B, C, D, and E are all synonyms of each other, the system may pair A and C and B and D first based on the similarity metric. The cluster score is then computed for the AC cluster and the BD cluster. Cluster E remains by itself in the second round/level. The cluster scores are then compared to the cluster scores for the individual clusters, namely A, B, C, D, and E. For example, the system may compare the AC cluster score to the cluster score for A and C. If the cluster score of AC is not better than A and C, the system may undo this cluster (and mark it as tried so it does not pair the two clusters again). If the cluster score for B and D is better (e.g., higher), than the cluster scores for B and D alone, the clustering may be kept. The system may continue rounds of pairing existing clusters having an ontological relationship together until intermediate clusters are formed. In some implementations, the first stage may end when pairs of ontologically related clusters no longer meet a minimum degree of similarity. The intermediate clusters represent the best clusters based on ontological relations, favoring similar clusters first.

In a next stage, the system may merge the intermediate clusters using a distance-based clustering methodology, such as hierarchical agglomerate clustering (620). In some implementations, the selection of cluster pairs for hierarchical clustering may be based on an embedding model similarity. In some implementations, intermediate clusters that are most similar, regardless of entity ontology, may be candidate cluster pairs. In some implementations, intermediate clusters that are ontologically related may receive a boost to their similarity score. For example, a distance metric may be decreased (i.e., indicating a higher degree of similarity) when the intermediate clusters being considered as a candidate pair include entities that are synonyms, hypernyms, or co-hypernyms. The clusters formed in the rounds of clustering may be scored and may be considered a first cluster set.

A second clustering method may be another two-stage clustering method. In this two-stage clustering method, the system first merges the first level clusters based on entity ontology, merging smallest clusters first (625). The entity ontology may relate one entity to another as a synonym, as a parent, as a child, or as the child of the same parent. Thus, in this clustering method, only a synonym entity, a parent entity, a child entity, or a sibling entity can be considered for merging, e.g., be a candidate pair. From among the candidate pairs, the system may select a candidate pair that has a smallest size among the pairs. Clustering in the first stage may be performed in rounds to determine the best clustering arrangement in a particular round. For example, if clusters A, B, C, D, and E are all synonyms of each other, the system may pair A and D together because they each contain the fewest members. The system may pair B and E together because they contain the second fewest pairs. The system may then compute the cluster score for the AD cluster and the BE cluster. Cluster C remains by itself in this second round. The cluster scores are then compared to the cluster scores for the individual member clusters from the previous level, as outlined above, with a merge being undone when the resulting cluster does not result in an increased quality (e.g., a higher cluster score). The system may continue rounds of pairing existing clusters having an ontological relationship and smallest members together until intermediate clusters are formed. The intermediate clusters represent the best clusters based on ontological relations, favoring smallest clusters first.

In a next stage, the system may merge the intermediate clusters using a distance-based clustering methodology, such as hierarchical agglomerate clustering (630). In some implementations, the selection of cluster pairs for hierarchical clustering may be based on an embedding model similarity. In some implementations, intermediate clusters that are most similar, regardless of entity ontology, may be candidate cluster pairs. In some implementations, intermediate clusters that are ontologically related may receive a boost to their similarity score. For example, a distance metric may be decreased when the intermediate clusters being considered as a candidate pair include entities that are synonyms, hypernyms, or co-hypernyms. The clusters formed in the rounds of clustering may be scored, with the hierarchical clustering generating final clusters that may be considered a second cluster set.

A third clustering method may be a conventional hierarchical cluster method that adjusts the similarity score based on entity ontology when determining which clusters to merge (635). As outlined above, the hierarchical clustering method may rely on a similarity metric between the clusters and may attempt to merge the most similar clusters first. However, the system may boost the similarity metric to favor higher similarity between two clusters when the two clusters include entities that are ontologically related. In some implementations, the boost may set the similarity metric to a highest similarity value. In some implementations, the boost may represent a percentage increase, such as 50%. Other implementations may use another value to boost the similarity metric. In some implementations, the similarity metric may be a distance based on an embedding space, as discussed above, with a smaller distance representing a higher similarity. The clusters in each round of clustering may be scored using the metrics outlined above. The clusters formed in these rounds of hierarchical clustering may be considered a third cluster set.

Figure 7:
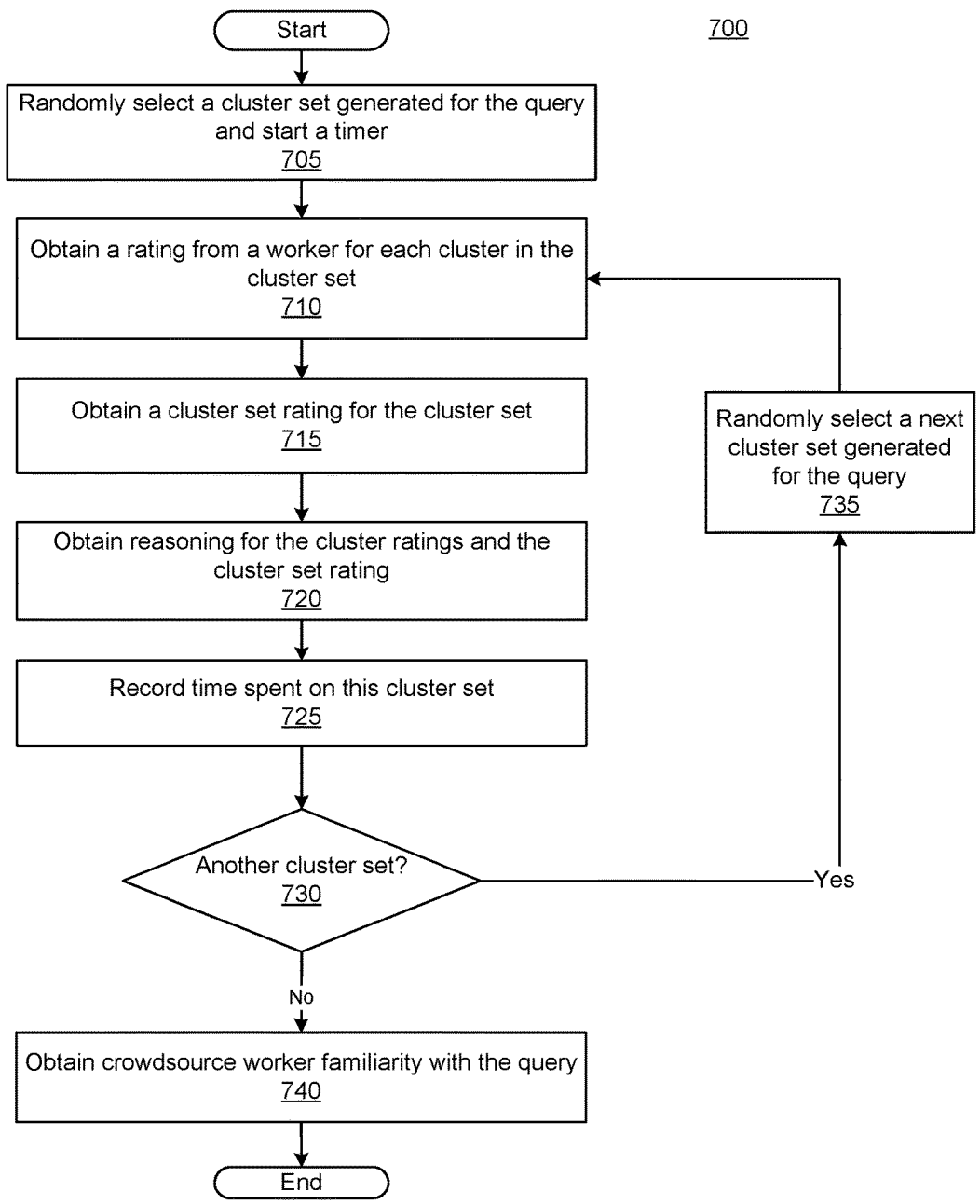
FIG. 7 illustrates a flow diagram of an example process for evaluating a plurality of cluster sets via crowdsource tasks, in accordance with disclosed subject matter.

In another clustering method, the system may apply hierarchical clustering using a similarity metric, but may not use entity ontology in any way (640). Thus, the hierarchical cluster may work as outlined above, but without the boost to the similarity metric. The clusters generated at each round may be evaluated using the evaluation metrics outlined above. Thus, the evaluation metrics used to score the clusters may remain constant across the various clustering algorithms performed in parallel. The clusters generated using this method may be considered a fourth cluster set. Although four clustering methods are illustrated, other clustering methods may be used, whether or not such methods use the first level clusters from step 610 or not. Process 600 then ends, FIG. 7 illustrates a flow diagram of an example process 700 for evaluating a plurality of cluster sets via crowdsource tasks to determine a best cluster set, in accordance with disclosed subject matter. Process 700 may be run by a search system as part of step 510 of FIG. 5. Process 700 begins with the system randomly selecting one cluster set from a plurality of cluster sets (705). This cluster set is the first set presented to the crowdsource worker for evaluation, e.g., via a user interface such as user interface 300 of FIG. 3. Because the selection is random, the system presents a different cluster set first for a subset of the crowdsource workers. Once the randomly selected cluster set is presented to the crowdsource worker, e.g., via the user interface, the system may also begin a timer. The timer tracks the amount of time the crowdsource worker spends evaluating this cluster set. The system may obtain a cluster rating for each cluster in the cluster set from the crowdsource worker (710). The cluster rating may be a binary rating, e.g., good or bad. In some implementations, the clustering methods used to generate the plurality of cluster sets may be tuned to generate at most five to seven clusters. This ensures that there are not too many clusters to evaluate or to display as part of the search results.

The system may also obtain a cluster set rating for this cluster set (715). The cluster set rating may have more possible values than the cluster rating. For example, the cluster set rating may be a Likert scale. As part of steps 710 and 715 the system may also record how often the crowdsource worker obtained more details about search items in the clusters. In some implementations, the additional details may appear in a pop-up window when the crowdsource worker hovers a cursor or finger over an icon for a search item. If the crowdsource worker never obtains more details, the system may conclude that the evaluations ratings are poor and disregard the ratings for this cluster set or down weight the ratings. The system may also obtain reasoning for the cluster ratings and the cluster set rating (720). The reasoning may be used to estimate the quality of worker judgment. For example, the system may dismiss or down weight the ratings of a particular worker when the explanation text is too short. As another example, the system may up weight ratings provided by a particular worker when the system identifies references to specific topics or other cluster information in the text. After receiving the ratings and reasoning, the system may record the time spent on the evaluation of this cluster set (725). This time may be used to weed out bad cluster ratings. An adequate cluster evaluation of clusters requires inspection of each individual cluster. If the crowdsource worker fails to spend a minimum amount of time on the evaluation, e.g., 150 seconds, the system may deem the evaluation of poor quality and may disregard the ratings or may down weight the ratings. If there is another cluster set for the crowdsource worker to evaluate (730, Yes), the system selects one of the remaining cluster sets at random (735) and performs steps 710 to 725 using the newly selected cluster set. Thus, the crowdsource worker evaluates each cluster set in the plurality of cluster sets independently.

When the crowdsource worker has evaluated each cluster set from the plurality of cluster sets (730, No), the system may optionally obtain an indication of the crowdsource worker's expertise, or in other words the level of familiarity the crowdsource worker has with the query and/or the search items in the clusters (740). The system may determine that a crowdsource worker who is familiar with the query and/or search items can better evaluate the cluster sets and may accord the ratings from this crowdsource worker more weight. Process 700 then ends, having collected cluster ratings, cluster set ratings, and other information that can be used to weight the ratings to determine a cluster score.

Figure 8:
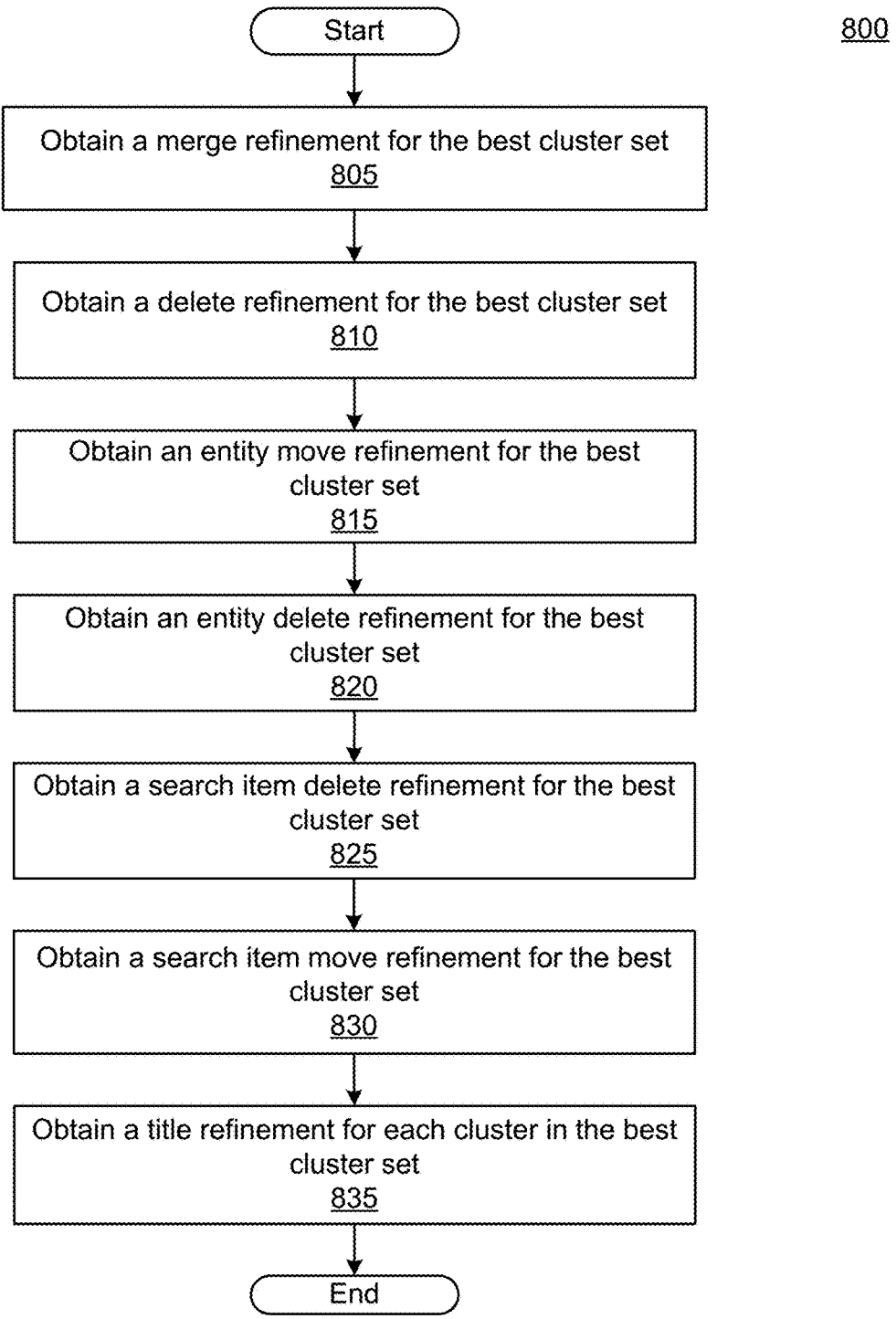
FIG. 8 illustrates a flow diagram of an example process for refining a cluster set via crowdsource tasks, in accordance with disclosed subject matter.

FIG. 8 illustrates a flow diagram of an example process 800 for refining a best cluster set via crowdsource tasks, in accordance with disclosed subject matter. Process 800 may be executed by a search system as part of step 520 of FIG. 5. While refinement tasks are illustrated in FIG. 8 in a particular order, implementations are not limited to the order shown and the refinement tasks may be presented in any order, may not include every refinement task illustrated, or may include additional refinement tasks. Process 800 may begin with the system obtaining a merge refinement for the best cluster set (805). The system may use a user interface similar to that illustrated in FIG. 4A to obtain the merge refinement. The merge refinement may be a suggestion to combine two or more clusters in the cluster set. The system may also obtain a delete refinement for the best cluster set (810). The system may use a user interface similar to that illustrated in FIG. 4B to obtain the delete refinement. The delete refinement may be a suggestion to delete one or more clusters from the cluster set. Deleting the clusters will remove any search items associated with the clusters from the search result presented to a query requestor if those search items do not also appear in another cluster. Thus, an agreement threshold may be set higher for the delete refinement than for other refinements. The system may obtain an entity move refinement for the best cluster set (815). The system may obtain the entity move refinement using a user interface similar to that illustrated in FIG. 4E. The entity move refinement may identify one or more topics or entities that should be moved from one cluster into another cluster within the cluster set. Moving an entity from one cluster to another cluster causes the search items associated with that entity to move to the destination cluster as well.

The system may also receive an entity delete refinement for the best cluster set (820). The entity delete refinement may remove an entity/topic from the cluster set. Removing the entity also removes any search items associated with the entity from the cluster set, unless the search item is also associated with another entity in the cluster set. The system may obtain the entity delete refinement using a user interface similar to that illustrated in FIG. 4D. The system may also receive a search item delete refinement for the cluster set (825). The search item delete refinement may be a suggestion to remove a particular search item from one of the clusters in the cluster set. In some implementations, such refinements cannot be accomplished by changing the cluster definition. In such implementations, a search item delete refinement (i.e., the suggestion) may be provided to an expert for further analysis of the search item. For example, the search item may by inappropriately associated with a particular topic or entity, which caused the search item to be included in the cluster and an expert may be able to determine whether the association is appropriate or not. In some implementations, the agreement threshold for a search item delete refinement may be low (e.g., 10%) so that a small amount of agreement by the crowdsource contributors indicates that the attributes for the search item may warrant closer inspection. The system may also obtain a search item move refinement for the best cluster set (830). The search item move refinement works similar to the entity move refinement, except that the suggestion is a suggestion to move the search from one cluster to another cluster. As with the search item delete refinement, the suggestion for the move may be sent to and reviewed by an expert, to determine if any data (e.g., entity) associated with the search item should be modified. The system may also obtain a title refinement for at least one of the clusters in the cluster set (835). The title refinement may be a suggestion for one or two entity titles that describe the cluster. Titles with more than a couple entities can get messy and confusing, so the refinement task may ask the crowdsource worker to select less than the total number of entities actually included in the cluster. Process 800 then ends, having obtained refinements, if any, for the cluster set that the system can use to automatically update the cluster definition.

FIG. 9 shows an example of a generic computer device 900, which may be system 100, and/or client 170 of FIG. 1, which may be used with the techniques described here. Computing device 900 is intended to represent various example forms of computing devices, such as laptops, desktops, workstations, personal digital assistants, cellular telephones, smart phones, tablets, servers, and other computing devices, including wearable devices. The components shown here, their connections and relationships, and their functions, are meant to be examples only, and are not meant to limit implementations of the inventions described and/or claimed in this document.

Computing device 900 includes a processor 902, memory 904, a storage device 906, and expansion ports 910 connected via an interface 908. In some implementations, computing device 900 may include transceiver 946, communication interface 944, and a GPS (Global Positioning System) receiver module 948, among other components, connected via interface 908. Device 900 may communicate wirelessly through communication interface 944, which may include digital signal processing circuitry where necessary. Each of the components 902, 904, 906, 908, 910, 940, 944, 946, and 948 may be mounted on a common motherboard or in other manners as appropriate.

The processor 902 can process instructions for execution within the computing device 900, including instructions stored in the memory 904 or on the storage device 906 to display graphical information for a GUI on an external input/output device, such as display 916. Display 916 may be a monitor or a flat touchscreen display. In some implementations, multiple processors and/or multiple buses may be used, as appropriate, along with multiple memories and types of memory. Also, multiple computing devices 900 may be connected, with each device providing portions of the necessary operations (e.g., as a server bank, a group of blade servers, or a multi-processor system).

The memory 904 stores information within the computing device 900. In one implementation, the memory 904 is a volatile memory unit or units. In another implementation, the memory 904 is a non-volatile memory unit or units. The memory 904 may also be another form of computer-readable medium, such as a magnetic or optical disk. In some implementations, the memory 904 may include expansion memory provided through an expansion interface.

The storage device 906 is capable of providing mass storage for the computing device 900. In one implementation, the storage device 906 may be or include a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in such a computer-readable medium. The computer program product may also include instructions that, when executed, perform one or more methods, such as those described above. The computer- or machine-readable medium is a storage device such as the memory 904, the storage device 906, or memory on processor 902.

The interface 908 may be a high speed controller that manages bandwidth-intensive operations for the computing device 900 or a low speed controller that manages lower bandwidth-intensive operations, or a combination of such controllers. An external interface 940 may be provided so as to enable near area communication of device 900 with other devices. In some implementations, controller 908 may be coupled to storage device 906 and expansion port 914. The expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 900 may be implemented in a number of different forms, as shown in the figure. For example, it may be implemented as a standard server 930, or multiple times in a group of such servers. It may also be implemented as part of a rack server system. In addition, it may be implemented in a personal computer such as a laptop computer 922, or smart phone 936. An entire system may be made up of multiple computing devices 900 communicating with each other. Other configurations are possible.

FIG. 10 shows an example of a generic computer device 1000, which may be system 100 of FIG. 1, which may be used with the techniques described here. Computing device 1000 is intended to represent various example forms of large-scale data processing devices, such as servers, blade servers, datacenters, mainframes, and other large-scale computing devices. Computing device 1000 may be a distributed system having multiple processors, possibly including network attached storage nodes, that are interconnected by one or more communication networks. The components shown here, their connections and relationships, and their functions, are meant to be examples only, and are not meant to limit implementations of the inventions described and/or claimed in this document.

Distributed computing system 1000 may include any number of computing devices 1080. Computing devices 1080 may include a server or rack servers, mainframes, etc. communicating over a local or wide-area network, dedicated optical links, modems, bridges, routers, switches, wired or wireless networks, etc.

In some implementations, each computing device may include multiple racks. For example, computing device 1080a includes multiple racks 1058a-1058n. Each rack may include one or more processors, such as processors 1052a-1052n and 1062a-1062n. The processors may include data processors, network attached storage devices, and other computer controlled devices. In some implementations, one processor may operate as a master processor and control the scheduling and data distribution tasks. Processors may be interconnected through one or more rack switches 1058, and one or more racks may be connected through switch 1078. Switch 1078 may handle communications between multiple connected computing devices 1000.

Each rack may include memory, such as memory 1054 and memory 1064, and storage, such as 1056 and 1066. Storage 1056 and 1066 may provide mass storage and may include volatile or non-volatile storage, such as network-attached disks, floppy disks, hard disks, optical disks, tapes, flash memory or other similar solid state memory devices, or an array of devices, including devices in a storage area network or other configurations. Storage 1056 or 1066 may be shared between multiple processors, multiple racks, or multiple computing devices and may include a computer-readable medium storing instructions executable by one or more of the processors. Memory 1054 and 1064 may include, e.g., volatile memory unit or units, a non-volatile memory unit or units, and/or other forms of computer-readable media, such as a magnetic or optical disks, flash memory, cache, Random Access Memory (RAM), Read Only Memory (ROM), and combinations thereof. Memory, such as memory 1054 may also be shared between processors 1052a-1052n. Data structures, such as an index, may be stored, for example, across storage 1056 and memory 1054. Computing device 1000 may include other components not shown, such as controllers, buses, input/output devices, communications modules, etc.

An entire system, such as system 100, may be made up of multiple computing devices 1000 communicating with each other. For example, device 1080a may communicate with devices 1080b, 1080c, and 1080d, and these may collectively be known as system 100. As another example, system 100 of FIG. 1 may include one or more computing devices 1000. Some of the computing devices may be located geographically close to each other, and others may be located geographically distant. The layout of system 1000 is an example only and the system may take on other layouts or configurations.

According to one aspect, a method for generating clustered search results includes, for each of a plurality of crowdsource workers, initiating display of a first cluster set from a plurality of cluster sets to the crowdsource worker, the first cluster set being selected at random from among the plurality of cluster sets, wherein each cluster set represents a different clustering algorithm applied to a set of search items responsive to a query, receiving cluster ratings for the first cluster set from the crowdsource worker, wherein each cluster rating is for a respective cluster in the first cluster set, calculating a cluster set score for the first cluster set based on the cluster ratings, and repeating initiating the display, receiving the cluster rating, and calculating the cluster set score for remaining cluster sets in the plurality of cluster sets, wherein selection of a next cluster set is selected at random. The method also includes storing a cluster set definition for the cluster set with a highest cluster set score, the cluster set definition being associated with the query and using, subsequent to receiving a request for the query, the cluster set definition to initiate display of search items responsive to the query.

These and other aspects can include one or more of the following features. For example, the method may also include tracking, for each of the plurality of crowdsource workers, time spent on each cluster in the cluster set, wherein the cluster set score is weighted based on the time spent. As another example, the method may also include receiving a cluster set rating for the first cluster set from the crowdsource worker and using the cluster set rating with the cluster ratings to calculate the respective cluster set score. In some implementations, the cluster set rating from a particular crowdsource worker and each cluster rating from the particular crowdsource worker are added together for a cluster score, and calculating the cluster set score includes finding an average cluster set score across the plurality of crowdsource workers. As another example, the cluster set definition may include, for each cluster in the cluster set, a list of entities in the cluster and wherein each search item is associated with one or more entities. As another example, calculating the cluster set score for a particular cluster set may include combining cluster ratings obtained by a particular crowdsource worker; and setting the cluster set score to an average of the combined cluster ratings across the crowdsource workers. As another example, the cluster rating may be a binary value.

As another example, a cluster set may represent a plurality of entities, with each entity in the plurality of entities assigned to one of the clusters in the cluster set and the method may also include initiating display of the cluster set with the highest respective cluster score to a crowdsource worker, receiving an indication that a first entity assigned to a first cluster of the cluster set should be assigned to a second cluster of the cluster set, and altering, when a minimum number of indications are received, the cluster set definition to assign the first entity with the second cluster. As another example, a cluster set may represent a plurality of entities, with each entity in the plurality of entities assigned to one of the clusters in the cluster set and the method may also include initiating display of the cluster set with the highest respective cluster score to a crowdsource worker, receiving an indication that a first entity assigned to a first cluster of the cluster set should be deleted, and altering, when a minimum number of indications are received, the cluster set definition to remove the assignment of the first entity to the first cluster. As another example, a cluster set may represent a plurality of entities, with each entity in the plurality of entities assigned to one of the clusters in the cluster set and the method may also include initiating display of the cluster set with the highest respective cluster score to a crowdsource worker, receiving an indication that a first search item in a first cluster of the cluster set should be deleted, a first entity being assigned to the first cluster, and providing feedback to an expert that the search item might not be associated with the first entity. As another example, a cluster set may represent a plurality of entities, with each entity in the plurality of entities assigned to one of the clusters in the cluster set and the method also includes initiating display of the cluster set with the highest respective cluster score to a crowdsource worker, receiving a title refinement for at least one cluster in the cluster set, the title refinement being based on entities assigned to the at least one cluster, and recording the title refinement.

In one general aspect, a system includes at least one processor and memory storing a plurality of cluster sets for a query, each cluster set representing search items responsive to the query assigned to one or more clusters of the cluster set and also storing instructions that, when executed by the at least one processor, cause the system to generate a user interface. The user interface may select, at random, a first cluster set from the plurality of cluster sets. The user interface may also initiate display of the clusters in the first cluster set to a crowdsource worker, receive a cluster rating for each cluster in the first cluster set from the crowdsource worker, receive a cluster set rating for the first cluster set. The user interface may also track time spent by the crowdsource worker on the cluster ratings and cluster set rating, calculate a cluster set score the first cluster set based on the cluster ratings, the cluster set score, and the time spent, and repeat, for remaining cluster sets in the plurality of cluster sets, selecting a next cluster set at random, initiating the display, receiving the cluster ratings, receiving the cluster set rating, tracking time spent, and calculating the cluster set score. The memory may also store instructions that, when executed by the at least one processor, cause the system to determine, using cluster set scores for a plurality of crowdsource workers, a cluster set from the plurality of cluster sets with a highest average cluster set score, and store a cluster set definition for the cluster set with the highest average total cluster set score.

These and other aspects can include one or more of the following features. For example, displaying the clusters in the first cluster set may include selecting a preselected quantity of highest quality search items associated with the cluster, displaying, for each of the highest quality search items, an icon for the search item, and displaying, when the crowdsource worker hovers a cursor over the icon, a description of the search item. In some implementations, the user interface may track time spent hovering over icons and calculating the cluster set score is further based on the time spent hovering. In some implementations, the user interface may track time spent hovering over icons and determining the highest average cluster set score includes discarding a cluster set score for a crowdsource worker when the crowdsource worker did not hover over any icons.

As another example, determining the highest average cluster set score can include discarding a cluster set score for a crowdsource worker when the time spent on the cluster set fails to meet a minimum time. As another example, the user interface may also receive an indication of the crowdsource worker's familiarity with the query and up weight the cluster set score for the crowdsource worker when the crowdsource worker is familiar with the query.

In one general aspect, a method of generating cluster-based search results includes generating a plurality of cluster sets, each cluster set including search items responsive to a query and each cluster set being generated with a different clustering method. The method also includes providing the cluster sets to a first plurality of crowdsource workers for evaluation, wherein each crowdsource worker may evaluate each cluster set in the plurality of cluster sets independently and in a random order and each crowdsource worker provides an evaluation for each cluster in a cluster set and an evaluation for the cluster set overall, and the evaluations produce a cluster set score that is based on the evaluations of the clusters, the evaluation of the cluster set overall, and time spent performing the evaluation. The method may also include determining a weighted cluster set score for each of the plurality of cluster sets, determining a cluster set from the plurality of cluster sets with a highest weighted cluster set score, providing the cluster set with the highest weighted cluster set score to a second plurality of crowdsource workers for refinement, and storing a cluster set definition for the cluster set with the highest weighted cluster set score subsequent to refinement, wherein the cluster set definition is associated with the query and used to organize a search result for the query.

These and other aspects can include one or more of the following features. For example, providing each cluster in the cluster set for evaluation can include initiating display of a preselected quantity of high quality search items in each cluster and receiving a cluster rating for each cluster in the cluster set from the crowdsource worker and providing the cluster set overall for evaluation can include receiving a cluster set rating for the cluster set from the crowdsource worker, and receiving an indication of expertise from the crowdsource worker and wherein determining the weighted cluster set score includes down weighting the cluster set score when the indication of expertise indicates low expertise. As another example, determining the weighted cluster set score can include down weighting a cluster set score when a crowdsource worker does not spend a minimum amount of time on each cluster in the cluster set.

Various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any non-transitory computer program product, apparatus and/or device (e.g., magnetic discs, optical disks, memory (including Read Access Memory), Programmable Logic Devices (PLDs)) used to provide machine instructions and/or data to a programmable processor.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, various modifications may be made without departing from the spirit and scope of the invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A method for generating clustered search results comprising:
   for each of a plurality of crowdsource workers:
      providing a user interface, the user interface displaying a first cluster set from a plurality of cluster sets to the crowdsource worker, the first cluster set being selected at random from among the plurality of cluster sets, wherein each cluster set represents a different clustering algorithm applied to a set of search items responsive to a query, wherein each cluster set includes a plurality of clusters, and wherein the user interface includes a respective input control for each cluster in the cluster set for selecting a cluster rating for the cluster from a set of pre-coded values,
      receiving, for each cluster in the first cluster set, selection of an input control representing a cluster rating for the cluster in the first cluster set from the crowdsource worker,
      and
      repeating providing the user interface, and receiving the cluster rating for remaining cluster sets in the plurality of cluster sets, wherein a next cluster set is selected at random;
   calculating a respective cluster set score for each cluster set of the plurality of cluster sets, the respective cluster set score for a cluster set including an average of the cluster ratings for the plurality of clusters in the cluster set;
   storing a cluster set definition for the cluster set with a highest cluster set score, the cluster set definition being associated with the query; and
   using, subsequent to receiving a request for the query, the cluster set definition to initiate display of search items responsive to the query.

2. The method of claim 1, further comprising tracking, for each of the plurality of crowdsource workers, time spent on each cluster in the cluster set, wherein the cluster set score is weighted based on the time spent.

3. The method of claim 1, wherein the user interface includes a second input control for selecting a cluster set rating and the method further comprises:
   for each of the plurality of crowdsource workers, receiving selection of an input control representing a cluster set rating for the first cluster set from the crowdsource worker,
   wherein the respective cluster set score for a cluster in the plurality of clusters includes a combination of the average of the cluster set ratings received from the plurality of crowdsource workers and the average of the cluster ratings for the plurality of clusters in the cluster set.

4. The method of claim 3, wherein the respective cluster set score is an average, across the plurality of crowdsource workers, of a sum of the cluster set rating from a particular crowdsource worker and each cluster rating from the particular crowdsource worker.

5. The method of claim 1, wherein the cluster set definition includes, for each cluster in the cluster set, a list of entities in the cluster and wherein each search item is associated with one or more entities.

6. The method of claim 1, wherein the average of the cluster ratings is calculated by:
   combining the cluster ratings for the plurality of clusters in the cluster set obtained from a particular crowdsource worker; and
   setting the cluster set score to an average of the combined cluster ratings across the crowdsource workers.

7. The method of claim 1, wherein the cluster rating is a binary value.

8. The method of claim 1, wherein a cluster set represents a plurality of entities, with each entity in the plurality of entities assigned to one of the clusters in the cluster set and the method further comprises:
   repeating, for a second plurality of crowdsource workers:
      providing a second user interface, the second user interface displaying the cluster set with the highest respective cluster score to a crowdsource worker of the second plurality of crowdsource workers, and
      receiving an indication, via the second user interface, that a first entity assigned to a first cluster of the cluster set should be assigned to a second cluster of the cluster set; and
   altering, responsive to determining that a minimum number of indications are received, the cluster set definition to assign the first entity to the second cluster.

9. The method of claim 1, wherein a cluster set represents a plurality of entities, with each entity in the plurality of entities assigned to one of the clusters in the cluster set and the method further comprises:
   repeating, for a second plurality of crowdsource workers:
      providing a second user interface, the second user interface displaying the cluster set with the highest respective cluster score to a crowdsource worker of the second plurality of crowdsource workers, and
      receiving an indication, via the second user interface, that a first entity assigned to a first cluster of the cluster set should be deleted; and
   altering, responsive to determining that a minimum number of indications are received, the cluster set definition to remove the assignment of the first entity to the first cluster.

10. The method of claim 1, wherein a cluster set represents a plurality of entities, with each entity in the plurality of entities assigned to one of the clusters in the cluster set and the method further comprises:
    providing a second user interface, the second user interface displaying the cluster set with the highest respective cluster score to a crowdsource worker;
    receiving an indication, via the second user interface, that a first search item in a first cluster of the cluster set should be deleted, a first entity being assigned to the first cluster; and
    providing feedback to an expert that the search item might not be associated with the first entity.

11. The method of claim 1, wherein a cluster set represents a plurality of entities, with each entity in the plurality of entities assigned to one of the clusters in the cluster set and the method further comprises:

providing a second user interface, the second user interface displaying the cluster set with the highest respective cluster score to a crowdsource worker;
receiving a title refinement, via the second user interface, for at least one cluster in the cluster set, the title refinement being based on entities assigned to the at least one cluster; and
recording the title refinement.

12. A system comprising:
at least one processor; and
memory storing
a plurality of cluster sets for a query, each cluster set representing search items responsive to the query assigned to one or more clusters of the cluster set;
instructions that, when executed by the at least one processor, cause the system to generate a user interface that:
selects, at random, a first cluster set from the plurality of cluster sets,
initiates display of the clusters in the first cluster set to a crowdsource worker,
the user interface including a respective input control for each cluster in the first cluster set for selecting a cluster rating for the cluster from a first set of pre-coded values and a second input control for selecting a cluster set rating for the cluster set from a second set of pre-coded values,
receives a respective cluster rating for each cluster in the first cluster set from the crowdsource worker via selection of the respective input control,
receives a cluster set rating for the first cluster set via selection of the second input control,
tracks time spent by the crowdsource worker on the cluster ratings and cluster set rating,
calculates a cluster set score the first cluster set based on the cluster ratings, the cluster set score, and the time spent, and
repeats, for remaining cluster sets in the plurality of cluster sets, selecting a next cluster set at random, initiating the display, receiving the cluster ratings, receiving the cluster set rating, tracking time spent, and calculating the cluster set score; and
instructions that, when executed by the at least one processor, cause the system to determine, using cluster set scores for a plurality of crowdsource workers, a cluster set from the plurality of cluster sets with a highest average cluster set score, and to store a cluster set definition for the cluster set with the highest average total cluster set score.

13. The system of claim 12, wherein displaying the clusters in the first cluster set includes:
selecting a preselected quantity of highest quality search items associated with the cluster;
displaying, for each of the highest quality search items, an icon for the search item; and
displaying, responsive to the crowdsource worker hovering a cursor over the icon, a description of the search item.

14. The system of claim 13, wherein the user interface tracks time spent hovering over icons and calculating the cluster set score is further based on the time spent hovering.

15. The system of claim 14, wherein the user interface tracks time spent hovering over icons and determining the highest average cluster set score includes discarding a cluster set score for a crowdsource worker responsive to determining that the crowdsource worker did not hover over any icons.

16. The system of claim 12, wherein determining the highest average cluster set score includes discarding a cluster set score for a crowdsource worker responsive to determining that the time spent on the cluster set fails to meet a minimum time.

17. The system of claim 12, wherein the user interface further includes third input control for receiving a query familiarity value from a third set of pre-coded values and the user interface weights the cluster set score for the crowdsource worker based on the query familiarity value selected via the third input control.

18. A method of generating cluster-based search results comprising:
generating a plurality of cluster sets, each cluster set including search items responsive to a query and each cluster set being generated with a different clustering method;
providing the cluster sets to a first plurality of crowdsource workers for evaluation via a user interface, the user interface including a cluster rating section, a cluster set rating section, and a query expertise section, the cluster rating section having a first input control for each displayed cluster, each first input control enabling selection of one of at least two pre-coded cluster rankings, the cluster set rating section having a second input control enabling selection of at least three pre-coded cluster set rankings, and the query expertise section having a third input control for selecting an expertise value for the query from at least two pre-coded expertise values, wherein:
each crowdsource worker evaluates each cluster set in the plurality of cluster sets independently and in a random order,
each crowdsource worker provides an evaluation for each cluster in a cluster set via the first input controls, an evaluation for the cluster set overall, via the second input control, and a familiarity rating for the query via the third input control, and
the evaluations produce a cluster set score that is based on the cluster ranking, the cluster set ranking, and time spent performing the evaluation;
determining a weighted cluster set score for each of the plurality of cluster sets, the weighting being based on the selected expertise value;
determining a cluster set from the plurality of cluster sets with a highest weighted cluster set score;
providing the cluster set with the highest weighted cluster set score to a second plurality of crowdsource workers for refinement; and:
storing a cluster set definition for the cluster set with the highest weighted cluster set score subsequent to refinement, wherein the cluster set definition is associated with the query and used to organize a search result for the query.

19. The method of claim 18, further comprising:
repeating the method for a plurality of queries, the query being one of the plurality of queries,
wherein a search system uses the cluster set definitions to format search results in responses to queries included in the plurality of queries.

20. The method of claim 18, wherein determining the weighted cluster set score includes down weighting a cluster set score responsive to determining that a crowdsource worker does not spend a minimum amount of time on each cluster in the cluster set.

* * * * *

UNITED STATES PATENT AND TRADEMARK OFFICE
CERTIFICATE OF CORRECTION

PATENT NO. : 10,331,681 B1
APPLICATION NO. : 15/095626
DATED : June 25, 2019
INVENTOR(S) : Chen et al.

Page 1 of 1

It is certified that error appears in the above-identified patent and that said Letters Patent is hereby corrected as shown below:

In the Claims

In Column 29, Claim 12, Line 11, delete "storing" and insert --storing:--, therefor.

In Column 30, Claim 18, Line 54, delete "and:" and insert --and--, therefor.

Signed and Sealed this
Twentieth Day of August, 2019

Andrei Iancu
*Director of the United States Patent and Trademark Office*